(12) United States Patent
MacKenna et al.

(10) Patent No.: US 6,502,181 B1
(45) Date of Patent: Dec. 31, 2002

(54) METHOD AND APPARATUS FOR AN ENHANCED PROCESSOR

(75) Inventors: Craig MacKenna, Los Gatos, CA (US); Gyle Yearsley, Boise, ID (US)

(73) Assignee: ZiLOG, Inc., San Jose, CA (US)

( * ) Notice: Subject to any disclaimer, the term of this patent is extended or adjusted under 35 U.S.C. 154(b) by 0 days.

(21) Appl. No.: 09/398,257

(22) Filed: Sep. 17, 1999

(51) Int. Cl.[7] .......................... G06F 15/76; G06F 12/08; G06F 13/16
(52) U.S. Cl. ...................... 712/32; 712/33; 712/210; 711/171; 711/212; 711/203; 703/26; 703/27
(58) Field of Search ............... 703/26, 20, 27, 703/16, 28, 22, 17; 712/209, 15, 202, 41, 42, 227, 228, 43, 217, 244, 132, 245, 30, 213, 210, 211, 32, 33; 711/202, 204, 203, 216, 207, 208, 123, 209, 152, 211, 171, 212, 172, 213, 173, 217, 148, 220, 221

(56) References Cited

U.S. PATENT DOCUMENTS

| 4,332,008 A | 5/1982 | Shima et al. ................ 711/106 |
| 4,794,524 A | 12/1988 | Carberry et al. ............... 712/32 |
| 5,381,537 A | 1/1995 | Baum et al. ................. 711/206 |
| 5,659,688 A | 8/1997 | Nimishakavi et al. ...... 710/113 |
| 5,774,686 A * | 6/1998 | Hammond et al. ............ 703/26 |
| 5,815,686 A * | 9/1998 | Earl et al. .................... 712/209 |
| 5,870,535 A | 2/1999 | Duffin et al. ............... 358/1.16 |
| 5,926,648 A | 7/1999 | Ayzenberg ................... 710/36 |

* cited by examiner

Primary Examiner—Daniel H. Pan
(74) Attorney, Agent, or Firm—Skjerven Morrill LLP

(57) ABSTRACT

A controller for executing instructions has one the order of five addressing modes and can allow executing of processes concurrently in multiple modes. A specific embodiment can effectively run legacy code written for the Z80 micoprocessor without requiring recompiling of code. An optional embodiment includes autonomous Multiply/Accumulator Engine (MAC) optimized to perform sum-of-products (SOP) operations with little controller overhead, making the invention capable of more effectively handling a number of processing tasks, particularly tasks related to digital signal processing (DSP).

28 Claims, 42 Drawing Sheets

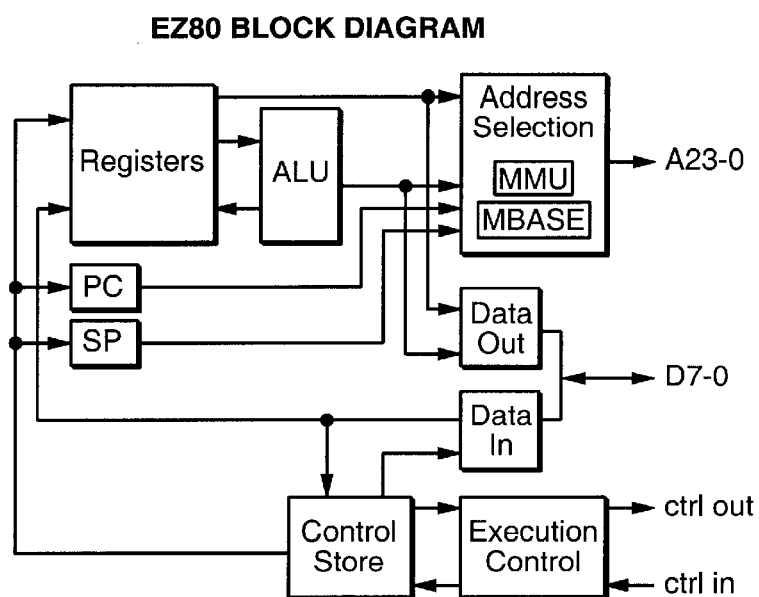
EZ80 BLOCK DIAGRAM
FIG._1
EZ80 LOGIC DIAGRAM
```
— D7         A23 —
— D6         A22 —
— D5         A21 —
— D4         A20 —
— D3         A19 —
— D2         A18 —
— D1         A17 —
— D0         A16 —
             A15 —
             A14 —
             A13 —
— CLK        A12 —
             A11 —
             A10 —
             A9  —
— RESET      A8  —
             A7  —
             A6  —
             A5  —
             A4  —
             A3  —
             A2  —
             A1  —
             A0  —
— WAIT       MREQ —
             IORQ —
             RD   —
             WR   —
             MRD  —
             MWR  —
             IORD —
— NMI        IOWR —
— INTO       INT AK —
— BUSREQ     BUSACK —
             INST RD —
             RETI —
             HALT —
— RXA0       TXA0 —
— DCD0       CKA0 —
— CTS0       RTS0 —
```
FIG._2

FIG._3

(Table 1) OPERATION OF CALL INSTRUCTION

| ADL | CALL prefix | Operation |
|---|---|---|
| 0 | None | stack a 2 byte logical return address using SPS mapped by MMU/MBASE; keep ADL 0; load a 2 byte logical address from the instruction into PC |
| 1 | None | stack a 3 byte return address stacked using SPL; keep ADL 1; load a 3 byte address from the instruction into PC. |
| 0 | .i16 | stack a 2 byte logical return address using SPS mapped by MMU/MBASE; stack a 00 byte using SPL; keep ADL 0; load a 2 byte logical address from the instruction into PC |
| 1 | .i16 | stack the 2 LS bytes of the return address using SPS mapped by MMU/MBASE; stack the MS byte of the return address using SPL; stack a 01 byte using SPL; clear ADL; load a 2 byte logical address from the instruction into PC. |
| 0 | .i24 | stack a 2 byte logical return address using SPL; stack a 00 byte using SPL; set ADL; load a 3 byte address from the instruction into PC |
| 1 | .i24 | stack a 3 byte return address using SPL; stack a 01 byte using SPL; keep ADL 1; load a 3 byte address from the instruction into PC |

FIG._4

| | FIG._4A |
|---|---|
| | FIG._4B |

FIG._4A (Table 2) OPERATION OF RST ET AL

| ADL | RST prefix | Operation |
|---|---|---|
| 0 | None | stack a 2 byte logical return address using SPS mapped by MMU/MBASE; keep ADL 0; load a 2 byte logical address 00xx into PC |
| 1 | None | stack a 3 byte return address stacked using SPL; keep ADL 1; load a 3 byte address 0000xx into PC. |
| 0 | .16 | stack a 2 byte logical return address using SPS mapped by MMU/MBASE; keep ADL 0; load a 2 byte logical address 00xx into PC |
| 1 | .16 | stack the 2 LS bytes of the return address using SPS mapped by MMU/MBASE; stack the MS byte of the return address using SPL; stack a 01 byte using SPL; clear ADL; load a 2 byte logical address 00xx into PC. |
| 0 | .24 | stack a 2 byte logical return address using SPL; stack a 00 byte using SPL; set ADL; load a 3 byte address 0000xx into PC |
| 1 | .24 | stack a 3 byte return address using SPL; stack a 01 byte using SPL; keep ADL 1; load a 3 byte address 0000xx into PC |

FIG._4B (Table 2 continued)

Operation of JP nnnn

| ADL | JP prefix | Operation |
|---|---|---|
| 0 | None | load 2-byte logical address from instruction into PC; keep ADL 0 |
| 1 | None | load 3-byte address from instruction into PC; keep ADL 1 |
| x | .i16 | Clear ADL, load a 2-byte logical address from the instruction into PC. |
| x | .i32 | Set ADL, load a 3-byte address from the instruction into PC. |

Operation of RET, RETI or RETN

| ADL | RET prefix | Operation |
|---|---|---|
| 0 | None | pop a 2-byte logical address from SPS mapped by MMU/MBASE into PC; ADL stays 0 |
| 1 | None | pop a 3-byte logical address from SPL into PC; ADL stays 1 |
| 0 | .16 or .24 | Pop a byte from SPS, load its units bit into ADL. If ADL is still 0, pop a 2-byte logical address from SPS mapped by MMU/MBASE into PC. If ADL is now 1, pop a byte from SPL into PC23-16, then pop two bytes from SPS mapped by MMU/MBASE into PC15-0. |
| 1 | .16 or .24 | Pop a byte from SPL, load its units bit into ADL. If ADL is now 0, pop a 2-byte logical address from SPL into PC. If ADL is still 1, pop a 3-byte address from SPL into PC. |

Operation of JP (rr)

| ADL | JP prefix | Operation |
|---|---|---|
| 0 | None | load a 2-byte logical address from the register into PC; keep ADL 0 |
| 1 | None | load a 3-byte address from the register into PC; keep ADL 1 |
| x | .16 | Clear ADL, load a 2-byte logical address from the register into PC. |
| x | .32 | Set ADL, load a 3-byte address from the register into PC. |

FIG._5 (Table 3)

| Instruction (class) | .16/.24 | .i16/.i24 |
|---|---|---|
| ADD/ADC/SUB/SBC/AND/OR/XOR/CP A,(HL/IX+d/IY+d) | Y | |
| ADD/ADC/SBC rr,rr | Y | |
| BIT/SET/RES b,(HL/IX+d/IY+d) | Y | |
| CALL | | Y |
| CPI, CPIR, CPD, CPDR | Y | |
| DJNZ | Y | |
| EX DE,HL | Y | |
| EX (SP),HL/IX/IY | Y | |
| INC/DEC (HL/IX+d/IY+d) | Y | |
| INC/DEC rr | Y | |
| INI, INIR, IND, INDR | Y | |
| JP nnnn | | Y |
| JP cc,nnnn | | Y |
| JP (HL/IX/IY) | Y | |
| JR | Y | |
| LD r,(HL/IX+d/IY+d) | Y | |
| LD (HL/IX+d/IY+d),r | Y | |
| LD (HL/IX+d/IY+d),n | Y | |
| LD A,(BC/DE) | Y | |
| LD (BC/DE),A | Y | |
| LD SP,HL/IX/IY | Y | |
| LD SP,nnnn | Y | Y |
| LD r,(nnnn) | Y | |
| LD (nnnn),r | Y | |
| LD rr,nnnn [rr other than SP] | Y | |
| LD rr,(nnnn) [incl. IX, IY, SP] | Y | Y |
| LD rr,(HL/IX+d/IY+d) | Y | |
| LD (HL/IX+d/IY+d),rr | Y | |
| LD (nnnn),rr [incl. IX, IY, SP] | Y | Y |
| LDI, LDIR, LDD, LDDR | Y | |
| OUTI, OTIR, OUTD, OTDR | Y | |
| POP | Y | |
| PUSH | Y | |
| RET | Y | |
| RETI | Y | |
| RETN | Y | |
| RLC/RL/RRC/RR/SLA/SRA/SRL (HL/IX+d/IY+d) | Y | |
| RST | Y | |
| TST (HL) | Y | |

FIG._6

(Table 4)

| Register | |
|---|---|
| X,Y Start | The addresses in the X and Y RAMs, respectively, of the first values to be multiplied. |
| X,Y End | Addresses in the X and Y RAMs, of the end of the circular buffer in each RAM. |
| X,Y Reload | Addresses in the X and Y RAMs, of the beginning of the circular buffer in each RAM. (As the MAC performs the calculation, it typically increments its working addresses to get to the next pair of values. If a working address matches the contents of the corresponding End register, instead of incrementing, the MAC loads the contents of the corresponding Reload register into the working address.) |
| Length | The number of pairs of values to be multiplied and accumulated. |
| Control | The accumulator is cleared when this register is written. It contains some or all of the following parameters:<br>In Shift: a 3-bit value that specifies the number of low-order bits that should be appended below the value written to AC0-4. If this field is non-zero and AC4 is written, this number of high-order bits are ignored.<br>Out Shift: a 3-bit value that specifies the number of low-order bits of the accumulation that should be discarded by shifting, when AC0-4 are read. If this field is non-zero, reading AC4 will include this number of high-order zeroes.<br>Noise: if In Shift is non-zero, the bit(s) that should be appended below the value written to AC0-4. [Could be replaced by increment/decrement bit.]<br>Interrupt Enable: if this bit is 1, the MAC will request an interrupt when it completes the calculation specified in this bank. |
| AC0-4 | A starting value for the accumulator can be written to these locations. The accumulated value can be read from these locations, using an INI2R instruction. |

FIG._7

(Table 5)

| Bits 3-2: Other Bank | Bits 1-0: Current Bank | MAC Status |
|---|---|---|
| 00 | 00 | Other Empty, Current Empty These fields reset to this state. If software writes a new calculation spec to the register bank, the MAC state goes to 10,00. |
| 10 | 00 | Other In progress, Current Empty. The MAC is working on a calculation. The microprocessor has read the result of any previous calculation, but has not yet loaded the specification of the next calculation into the current register bank. If it does so before the MAC finishes, the state goes to 10,01. If the MAC finishes before the MPU specs the next calculation, the state goes to 11,00. |
| 11 | 00 | Other Done, Current Empty. The MAC has completed a calculation. The software has read the result of any previous calculation, but has not yet loaded the specification of the next calculation into the current register bank. If software does so, the state will go to 10,11. If there is no next calculation to be done and software wants to read the result accumulation, it can flip the banks to state 00,11 by writing a hex 80 to the Status register. |
| 00 | 11 | Other Empty, Current Done. The MAC has completed the calculation specified in this register bank, and the result accumulation can be read from AC0-4. When software does so, the state goes to 00,00. |
| 10 | 01 | Other In Progress, Current Ready. The MAC is working on a calculation, and the microprocessor has loaded the specification of the next calculation into the current register bank. When the MAC finishes with one calculation, it goes on to the other and the state changes to 10,11. |
| 10 | 11 | Other In Progress, Current Done. The MAC is working on a calculation, and software has not yet read out the result of the previous calculation. If software does this before the MAC finishes, the state changes to 10,00. If the MAC finishes before software reads out the previous result, the state changes to 11,11. |
| 11 | 11 | Other Done, Current Done. The MAC has completed two calculations, but software hasn't read out the result of either. When it reads out the first result, the state changes to 00,11. |

FIG._8   (Table 6) STATE OF IEF1 AND IEF2

| CPU Operation | IEF1 | IEF2 | Remarks |
|---|---|---|---|
| RESET | 0 | 0 | Inhibits the interrupt except NMI and TRAP |
| NMI | 0 | IEF1 | Copies the contents of IEF1 to IEF2 |
| RETN | IEF1 | Not affected | Returns from the NMI service Routine |
| Interrupt except NMI and Trap | 0 | 0 | Inhibits the interrupt except NMI and TRAP |
| RETI | Not affected | Not affected | |
| TRAP | Not affected | Not affected | |
| EI | 1 | 1 | |
| DI | 0 | 0 | |
| LD A, I | Not affected | Not affected | Transfer the contents of IEF2 to P/V flag |
| LD A, R | Not affected | Not affected | Transfers the contents of IEF2 to P/V flag |

FIG._9A  (Table 7) PROCESSOR AND DEVICE PIN DESCRIPTIONS

| Symbol | PIN # | Function | Type | Description |
|---|---|---|---|---|
| A23-0 | | Address Bus | Bidirectional, 3-state | These lines select a location in memory or I/O space to be read or written. The EZ80 does not drive these lines during reset nor external bus acknowledge cycles. |
| BUSACK | | Bus Acknowledge | Output, active low | The EZ80 responds to a low on BUSREQ, by 3-stating the address, data, and control signals and driving this line low. |
| BUSREQ | | Bus request | Input, active low | External devices can force the EZ80 to release the bus for their use, by driving this line low. |
| CLK | | Clock | Input | The master clock of the EZ80. |
| D7-0 | | Data Bus | Bidirectional, 3-state | These lines transfer information to and from I/O and memory devices. The EZ80 drives these lines only during write cycles. |
| HALT | | Halt | Output, active low | A low on this pin indicates that the EZ80 is stopped because of a HALT or SLP instruction. |
| INSTRD | | Instruction Read | Output, active low, 3-state | INSTRD low (with MREQ and MRD low) indicates that the EZ80 is fetching an instruction from memory. The EZ80 does not drive this line during Reset, nor during bus acknowledge cycles. |
| INT0 | | Interrupt Request 0 | Input, active Low | External devices can drive this line low to request an interrupt. The processor responds to this request at the end of the current instruction cycle if it is enabled, and the NMI and BUSREQ signals are inactive. |
| INTAK | | Interrupt Acknowledge | Output, active low, 3-state | INTAK low indicates that the EZ80 is acknowledging an interrupt request on INT0. The EZ80 does not drive this line during Reset, nor during bus acknowledge cycles. |
| IORD | | I/O Read | Output, active low, 3-state | IORD low indicates that the EZ80 is reading data from a location in I/O space. The addressed I/O device uses this signal to gate data onto the data bus. The EZ80 does not drive this line during Reset, nor during bus acknowledge cycles. |
| IORQ | | I/O Request | Output, active low, 3-state | IORQ low indicates that the EZ80 is accessing a location in I/O space. The RD and WR pins indicate the type of access. The EZ80 does not drive this line during Reset, nor during bus acknowledge cycles. |

FIG._9B (Table 7 continued) PROCESSOR AND DEVICE PIN DESCRIPTIONS

| Symbol | Pin # | Function | Type | Description |
|---|---|---|---|---|
| IOWR | | I/O Write | Output, active low, 3-state | IOWR low indicates that D7-0 hold data to be stored at the addressed I/O location. The EZ80 does not drive this line during Reset, nor during bus acknowledge cycles. |
| MRD | | Memory Read | Output, active low, 3-state | MRD low indicates that the EZ80 is reading data from a location in memory space. The addressed memory uses this signal to gate data onto the data bus. The EZ80 does not drive this line during Reset, nor during bus acknowledge cycles. |
| MREQ | | Memory Request | Output, active low, 3-state | MREQ low indicates that the EZ80 is accessing a location in memory. The RD, WR, and INSTRD pins indicate the type of access. The EZ80 does not drive this line during Reset, nor during bus acknowledge cycles. |
| MWR | | Memory Write | Output, active low, 3-state | MWR low indicates that D7-0 hold data to be stored at the addressed memory location. The EZ80 does not drive this line during Reset, nor during bus acknowledge cycles. |
| NMI | | Nonmaskable Interrupt | Input, falling-edge active | NMI has a higher priority than INT0 and is always recognized at the end of an instruction, regardless of the state of the interrupt enable flip-flops. This signal forces processor execution to location 0066H. This input includes a Schmitt trigger to allow RC rise times. |
| RESET | | Master Reset | Input/Output, active low | This signal is used to initialize the EZ80 and other devices in the system. This input must be low for a minimum number of system clock cycles, and must be held low until the clock is stable. This input includes a Schmitt trigger to allow RC rise times. |
| RETI | | Return from Interrupt | Output, active low | A low on this line indicates that the EZ80 is executing an RETI instruction. |
| Vdd | | Power Supply | | These pins carry power to the device. They must be tied to the same voltage externally. |
| Vss | | Ground | | These pins are the ground references for the device. They must be tied to the same voltage externally. |
| WAIT | | Wait | Input, active low | External devices can extend bus cycles to more than one clock, by driving this line low. |

FIG._10   (Table 8) COMMON BASE REGISTER (0038H) CBR

| Bit | 7 | 6 | 5 | 4 | 3 | 2 | 1 | 0 |
|---|---|---|---|---|---|---|---|---|
| Bit/Field | \multicolumn{8}{l}{Base of Common Area 1} | | | | | | | |
| R/W | R/W | | | | | | | |
| Reset | 0 | 0 | 0 | 0 | 0 | 0 | 0 | 0 |
| NOTE: R = Read W = Write X = Indeterminate | | | | | | | | |

| Bit Position | Bit/Field | R/W | Value | Description |
|---|---|---|---|---|
| 7-0 | Common 1 Area Base | R/W |  | If the comparison of bits 15-12 of a logical address indicates that the address is in Common Area 1, this value (shifted left 12 bits, times 4096) is added to the logical address to form the physical address. |

FIG._11   (Table 9) BANK BASE REGISTER (0039H) BBR

| Bit | 7 | 6 | 5 | 4 | 3 | 2 | 1 | 0 |
|---|---|---|---|---|---|---|---|---|
| Bit/Field | Base of Bank Area | | | | | | | |
| R/W | R/W | | | | | | | |
| Reset | 0 | 0 | 0 | 0 | 0 | 0 | 0 | 0 |
| R = Read W = Write X = Indeterminate | | | | | | | | |

| Bit Position | Bit/Field | R/W | Value | Description |
|---|---|---|---|---|
| 7-0 | Bank Area Base | R/W |  | If the comparison of bits 15-12 of a logical address indicates that the address is in the Bank Area, this value (shifted left 12 bits, times 4096) is added to the logical address to form the physical address. |

FIG._12  (Table 10) COMMON/BANK REGISTER (003AH) CBAR

| Bit | 7 | 6 | 5 | 4 | 3 | 2 | 1 | 0 |
|---|---|---|---|---|---|---|---|---|
| Bit/Field | Bank/Common 1 Boundary | | | | Common 0/Bank Boundary | | | |
| R/W | R/W | | | | R/W | | | |
| Reset | 1 | 1 | 1 | 1 | 0 | 0 | 0 | 0 |

R = Read  W = Write  X = Indeterminate

| Bit Position | Bit/Field | R/W | Value | Description |
|---|---|---|---|---|
| 7-4 | Bank/Common 1 Boundary | R/W | | If bits 15-12 of a logical address are greater than or equal to this value, the address is in Common Area 1. |
| 3-0 | Common 0/Bank Boundary | R/W | | If bits 15-12 of a logical address are less than this value, the address is in Common Area 0. |

NOTE: If bits 3-0 of this reg < bits 15-12 of a logical address < bits 7-4 of this reg, the address is in the Bank Area. Do not program this register so that bits 3-0 > bits 7-4. All comparisons are unsigned.

FIG._13  (Table 11) LOAD INSTRUCTIONS

| Mnemonic | Operands | Instruction |
|---|---|---|
| LD | dst,src | Load |
| LEA | qq,IX/Yd | Load Effective Address |
| PEA | IX/Yd | Push Effective Address |
| POP | dst | Pop |
| PUSH | src | Push |

FIG._14  (Table 12) ARITHMETIC INSTRUCTIONS

| Mnemonic | Operands | Instruction |
|---|---|---|
| ADC | dst,src | Add with Carry |
| ADD | dst,src | Add |
| CP | A,src | Compare |
| CPD(R) | | Block Scan, decrementing (and Repeat) |
| CPI(R) | | Block Scan, incrementing (and Repeat) |
| DAA | | Decimal Adjust Accumulator |
| DEC | dst | Decrement |
| INC | dst | Increment |
| MLT | rr | Multiply |
| NEG | | Negate Accumulator |
| SBC | dst,src | Subtract with Carry |
| SUB | A,src | Subtract |

FIG._15    (Table 13) LOGICAL INSTRUCTIONS

| Mnemonic | Operands | Instruction |
|---|---|---|
| AND | A,src | Logical AND |
| CPL |  | Complement accumulator |
| OR | A,src | Logical OR |
| TST | A,src | Test accumulator |
| XOR | A,src | Logical Exclusive OR |

FIG._16    (Table 14) EXCHANGE INSTRUCTIONS

| Mnemonic | Operands | Instruction |
|---|---|---|
| EX | AF,AF' | Exchange Accumulator and Flags |
| EX | DE,HL | Exchange DE and HL |
| EX | (SP),rr | Exchange register and top of stack |
| EXX |  | Exchange register banks |

FIG._17    (Table 15) PROGRAM CONTROL INSTRUCTIONS

| Mnemonic | Operands | Instruction |
|---|---|---|
| CALL | cc,dst | Conditional Call |
| CALL | dst | Call |
| DJNZ | dst | Decrement and Jump if Non-Zero |
| JP | cc,dst | Conditional Jump |
| JP | dst | Jump |
| JR | cc',dst | Conditional Jump Relative |
| JR | dst | Jump Relative |
| RET | cc | Conditional Return |
| RET |  | Return |
| RETI |  | Return from Interrupt |
| RETN |  | Return from Nonmaskable interrupt |
| RST | dst | Restart |

FIG._18    (Table 16) BIT MANIPULATION INSTRUCTIONS

| Mnemonic | Operands | Instruction |
|---|---|---|
| BIT | n,src | Bit test |
| RES | n,dst | Reset bit |
| SET | n,dst | Set bit |

FIG._19    (Table 17) BLOCK TRANSFER INSTRUCTIONS

| Mnemonic | Operands | Instruction |
|---|---|---|
| LDD(R) |  | Block Move, decrementing (and Repeat) |
| LDI(R) |  | Block Move, incrementing (and Repeat) |

FIG._20    (Table 18) ROTATE AND SHIFT INSTRUCTIONS

| Mnemonic | Operands | Instruction |
| --- | --- | --- |
| RL | dst | Rotate Left |
| RLA | | Rotate Left Accumulator |
| RLC | dst | Rotate Left Circular |
| RLCA | | Rotate Left Circular Accumulator |
| RLD | | Rotate Left Decimal |
| RR | dst | Rotate Right |
| RRA | | Rotate Right Accumulator |
| RRC | dst | Rotate Right Circular |
| RRCA | | Rotate Right Circular Accumulator |
| RRD | | Rotate Right Decimal |
| SLA | dst | Shift Left |
| SRA | dst | Shift Right Arithmetic |
| SRL | dst | Shift Right Logical |

FIG._21    (Table 19) INPUT/OUTPUT INSTRUCTIONS

| Mnemonic | Operands | Instruction |
| --- | --- | --- |
| IN | A, (n) | Input to A from port n |
| IN | r, (C) | Input to register from port in BC |
| IN0 | r, (n) | Input to r from port n in page 0 |
| IND(R) | | Block Input, decrement HL (and Repeat) |
| IND2(R) | | Block Input, decrement both (and Repeat) |
| INDM(R) | | Block Input, page 0, decrement both (and Repeat) |
| INI(R) | | Block Input, increment HL (and Repeat) |
| INI2(R) | | Block Input, decrement both (and Repeat) |
| INIM(R) | | Block Input, page 0, increment both (and Repeat) |
| OTDM(R) | | Block Output, page 0, decrement both (and Repeat) |
| OTIM(R) | | Block Output, page 0, increment both (and Repeat) |
| OUT | (n), A | Output from A to port n |
| OUT | (C), r | Output from register to port in BC |
| OUT0 | (n), r | Output from register to port n in page 0 |
| OUTD (OTDR) | | Block Output, decrement HL (and Repeat) |
| OUTD2 (OTD2R) | | Block Output, decrement both (and Repeat) |
| OUTI (OTIR) | | Block Output, increment HL (and Repeat) |
| OUTI2 (OTI2R) | | Block Output. decrement both (and Repeat) |
| TSTIO | n | Test port (0,C) under mask |

FIG. 22 (Table 20) PROCESSOR CONTROL INSTRUCTIONS

| Mnemonic | Operands | Instruction |
|---|---|---|
| CCF | | Complement Carry Flag |
| DI | | Disable Interrupts |
| EI | | Enable Interrupts |
| HALT | | Halt |
| IM | 0/1/2 | Interrupt Mode |
| NOP | | No Operation |
| RSMIX | | Reset Mix Flag |
| SCF | | Set Carry Flag |
| SLP | | Sleep |
| STMIX | | Set Mix Flag |

FIG. 23 (Table 21) FLAG REGISTER

| Bit | 7 | 6 | 5 | 4 | 3 | 2 | 1 | 0 |
|---|---|---|---|---|---|---|---|---|
| Name | S | Z | x | HC | x | P/V | N | CF |
| Reset | 0 | 0 | x | 0 | x | 0 | 0 | 0 |

X=Indeterminate

| Bit/Field | Bit Position | Description |
|---|---|---|
| S | 7 | Sign Flag |
| Z | 6 | Zero Flag |
| | 5 | reserved |
| HC | 4 | Half-carry Flag |
| | 3 | reserved |
| P/V | 2 | Parity or Overflow Flag |
| N | 1 | Add/Subtract Flag |
| CF | 0 | Carry Flag |

FIG._24  (Table 22) FLAG SETTINGS DEFINITIONS

| Symbol | Definition |
|---|---|
| 0 | Cleared to 0 |
| 1 | Set to 1 |
| * | Set or cleared according to the result of the operation |
| - | Unaffected |
| X | Undefined |
| V | Set if Overflow or Underflow |
| P | Set if Parity or result is Even |
| NZ | Set if the count in B or BC is non-zero |

FIG._25  (Table 23) CONDITION CODES

| Mnemonic | Definition | Flag Settings | Valid in JR? |
|---|---|---|---|
| C | Carry | CF = 1 | Y |
| NC | No Carry | CF = 0 | Y |
| Z | Zero | Z = 1 | Y |
| NZ | Non-Zero | Z = 0 | Y |
| M | Minus | S = 1 | N |
| P | Positive or zero | S = 0 | N |
| PE | Parity Even | P/V = 1 | N |
| PO | Parity Odd | P/V = 0 | N |
| V | Overflow | P/V = 1 | N |
| NV | No Overflow | P/V = 0 | N |

FIG._26A  (Table 24) INSTRUCTION CODING SYMBOLS

| Symbol | Definition |
|---|---|
| (aa) | (mn), (IXd), (IYd), (BC), (DE), or (HL). |
| (BC), (DE), (HL) | The 8-bit contents of memory, at the address pointed to by a register pair. (HL) can also indicate a 16-bit value in memory. |
| (IXd), (IYd) | The 8- or 16-bit content of memory at the address formed by adding the contents of the index register and the signed displacement d in the instruction. |
| (mn) | The 8-bit content of memory at the direct address mn |
| (SP) | The 16-bit contents of memory at the address pointed to by SP, and the next higher address. |
| d | Since d is signed, it would be more correct to just write + instead. But we write to emphasize that d is signed. |
| AF | A concatenated with F, with A as the more significant byte |
| b | A bit number 0-7 |
| cc | A condition code C, NC, Z, NZ, S, M, PE, PV, V, or NV |
| cc' | A condition code C, NC, Z, or NZ |
| d | An 8-bit signed displacement -128 to +127 |
| ee | A 16-bit register *BC, DE, HL, SP, IX,* or *IY* |
| IEF1,2 | The processor's two Interrupt Enable Flags. |
| ih | IXH or IYH |
| il | IYH or IYL |
| ir | IXH, IXL, IYH, or IYL |
| m | An 8-bit variable A, B, C, D, E, H, L, (HL), (IXd), or (IYd) |
| mn | A 16-bit immediate data value or direct address |
| n | A 8-bit immediate value or port number, 0-255 or 0-FFH |

FIG._26B (Table 24 continued) INSTRUCTION CODING SYMBOLS

| Symbol | Definition |
|---|---|
| op1-op2 | A range of opcode values, that includes some of the values between the low and high values. See the Note. |
| PC | Program Counter |
| pp | A 16-bit register BC, DE, HL, SP, IX, IY, or AF |
| q | A, B, C, D, E, H, L, IXH, IXL, IYH, IYL, (HL), (IXd), or (IYd) |
| qq | A 16-bit register BC, DE, HL, IX, or IY |
| r, r' | An 8-bit register *A, B, C, D, E, H,* or *L*. |
| rae | An 8-bit register A, B, C, D, or E |
| rr | A 16-bit register HL, IX, or IY. |
| s | A, B, C, D, E, H, L, IXH, IXH, IYH, IYL, n, (HL), (IXd), or (IYd) |
| SP | Stack Pointer |
| ss | A 16-bit register BC, DE, HL, or SP. |
| ssH, ssL | The more- and less-significant eight bits of a register pair |
| tt | A 16-bit register like *ss*, except that the value that designates HL in the *ss* encoding, here means same as the destination register HL, IX, or IY. |
| Note: The symbol - between op codes (op1-op2), in the op codes column of the Instruction Summary table, indicates all the binary values between the indicated lower and upper limits inclusive, that can be formed by incrementing the set of bits that differ between the lower and upper value.<br>Example: 00-C0 represents 00, 40, 80, and C0, while 40-BF represents all the values in that range. | |

FIG._27A
(Table 25)

| Instruction Summary | | | | | | | | | |
|---|---|---|---|---|---|---|---|---|---|
| | Address Mode | | OpCode(s) (Hex) | Flags Affected | | | | | |
| Instruction and Operation | dst | src | | S | Z | HC | P/V | N | CF |
| ADC A,s<br>A ¨ A + s + CF | | r | 88-8F | * | * | * | V | 0 | * |
| | | ir | DD/FD 8C-8D | | | | | | |
| | | n | CE | | | | | | |
| | | (HL) | 8E | | | | | | |
| | | (IX/Yd) | DD/FD 8E | | | | | | |
| ADC HL,ss<br>HL ¨ HL+ ss + CF | | | ED 4A-7A | * | * | * | V | 0 | * |
| ADD A,s<br>A ¨ A + s | | r | 80-87 | * | * | * | V | 0 | * |
| | | ir | DD/FD 84-85 | | | | | | |
| | | n | C6 | | | | | | |
| | | (HL) | 86 | | | | | | |
| | | (IX/Yd) | DD/FD 86 | | | | | | |
| ADD rr,tt<br>rr ¨ rr + tt | HL | | 09-39 | - | - | * | - | 0 | * |
| | IX/Y | | DD/FD 09-39 | | | | | | |
| AND A,s<br>A ¨ A and s | | r | A0-A7 | * | * | 1 | P | 0 | 0 |
| | | ir | DD/FD A4-A5 | | | | | | |
| | | n | E6 | | | | | | |
| | | (HL) | A6 | | | | | | |
| | | (IX/Yd) | DD/FD A6 | | | | | | |
| BIT b,m<br>Z ¨ not (bit b of m) | | r | CB 40-7F | X | * | 1 | X | 0 | - |
| | | (HL) | CB 46-7E | | | | | | |
| | | (IX/Yd) | DD/FD CB d 46-7E | | | | | | |
| CALL cc,Mmn<br>IF cc {SP ¨ SP - 2<br>  (SP) ¨ PC15-0<br>  IF ADL {SPL ¨ SPL - 1<br>    (SPL) ¨ PC23-0}<br>  IF .i16 OR .i24 {<br>    SPL ¨ SPL-1<br>    (SPL) ¨ ADL<br>    ADL ¨ .i16 ? 0 : 1}<br>  PC15-0 ¨ mn<br>  IF ADL {PC23-16 " M}} | | | C4-FC | - | - | - | - | - | - |
| CALL Mmn<br>SP ¨ SP - 2<br>(SP) ¨ PC15-0<br>IF ADL {SPL ¨ SPL - 1<br>  (SPL) ¨ PC23-0}<br>IF .i16 OR .i24 {<br>  SPL ¨ SPL-1<br>  (SPL) ¨ ADL<br>  ADL " .i16 ? 0 : 1} | | | CD | - | - | - | - | - | - |

FIG._27B (Table 25 continued)

| Instruction Summary | | | | | | | | | |
|---|---|---|---|---|---|---|---|---|---|
| | Address Mode | | OpCode(s) (Hex) | Flags Affected | | | | | |
| Instruction and Operation | dst | src | | S | Z | HC | P/V | N | CF |
| PC15-0 " mn IF ADL {PC23-16 " M} | | | | | | | | | |
| CCF CF " not CF | | | 3F | - | - | * | - | 0 | * |
| CP A,s A - s | | r | B8-BF | * | * | * | V | 1 | * |
| | | ir | DD/FD BC-BD | | | | | | |
| | | n | FE | | | | | | |
| | | (HL) | BE | | | | | | |
| | | (IX/Yd) | DD/FD BE | | | | | | |
| CPD A - (HL) HL " HL - 1 BC " BC - 1 | | | ED A9 | * | * | * | NZ | 1 | - |
| CPDR repeat {A - (HL) HL " HL - 1 BC " BC - 1 } while (not Z and BC!=0) | | | ED B9 | * | * | * | NZ | 1 | - |
| CPI A - (HL) HL " HL + 1 BC " BC - 1 | | | ED A1 | * | * | * | NZ | 1 | - |
| CPIR repeat {A - (HL) HL " HL + 1 BC " BC - 1 } while (not Z and BC!=0) | | | ED B1 | * | * | * | NZ | 1 | - |
| CPL A " not A | | | 2F | - | - | 1 | - | 1 | - |
| DAA A " decimal adjust (A,F) | | | 27 | * | * | * | P | - | * |
| DEC ee ee " ee - 1 | ss | | 0B-3B | - | - | - | - | - | - |
| | IX/Y | | DD/FD 2B | | | | | | |
| DEC q q " q - 1 | | r | 05-3D | * | * | * | V | 1 | - |
| | | ir | DD/FD 25/2D | | | | | | |
| | | (HL) | 35 | | | | | | |
| | | (IX/Yd) | DD/FD 35 | | | | | | |
| DI IEF1,2 " 0 | | | F3 | - | - | - | - | - | - |
| DJNZ d B " B - 1 if B != 0 {PC " PCd} | | | 10 | - | - | - | - | - | - |

FIG._27C (Table 25 continued)

| Instruction Summary |||||||||
|---|---|---|---|---|---|---|---|---|
| | Address Mode || OpCode(s) (Hex) | Flags Affected |||||
| Instruction and Operation | dst | src | | S | Z | HC | P/V | N | CF |
| EI<br>IEF1,2 ¨ 1 | | | FB | - | - | - | - | - | - |
| EX AF,AF'<br>AF ´ AF' | | | 08 | * | * | * | * | * | * |
| EX (SP),rr<br>(SP) ´ rr | HL<br>IX/Y | | E3<br>DD/FD E3 | - | - | - | - | - | - |
| EXX<br>BC ´ BC'<br>DE ´ DE'<br>HL ´ HL' | | | D9 | - | - | - | - | - | - |
| HALT | | | 76 | - | - | - | - | - | - |
| IM n | | | ED 40-58 | - | - | - | - | - | - |
| IN A,(n)<br>A ¨ (n) | | | DB | - | - | - | - | - | - |
| IN r,(C)<br>r ¨ (BC) | | | ED 40-78 | * | * | 0 | P | 0 | - |
| IN0 r,(n)<br>r ¨ (0,n) | | | ED 00-38 | * | * | 0 | P | 0 | - |
| INC ee<br>ee ¨ ee + 1 | ss<br>IX/Y | | 03-33<br>DD/FD 23 | - | - | - | - | - | - |
| INC q<br>q ¨ q + 1 | r<br>ir<br>(HL)<br>(IX/Yd) | | 04-3C<br>DD/FD 24/2C<br>34<br>DD/FD 34 | * | * | * | V | 0 | - |
| IND<br>(HL) ¨ (BC)<br>B ¨ B - 1<br>HL ¨ HL - 1 | | | ED AA | X | * | X | X | 1 | - |
| IND2<br>(HL) ¨ (BC)<br>B ¨ B - 1<br>C ¨ C - 1<br>HL ¨ HL - 1 | | | ED 8C | X | * | X | X | 1 | - |
| IND2R<br>do {(HL) ¨ (BC)<br>B ¨ B - 1<br>C ¨ C - 1<br>HL ¨ HL - 1<br>} while B != 0 | | | ED 9C | X | 1 | X | X | 1 | - |
| INDM<br>(HL) ¨ (0,C)<br>B ¨ B - 1<br>C ¨ C - 1<br>HL ¨ HL - 1 | | | ED 8A | * | * | * | P | * | * |

FIG._27D (Table 25 continued)

| Instruction and Operation | Address Mode | | OpCode(s) (Hex) | Flags Affected | | | | | |
|---|---|---|---|---|---|---|---|---|---|
| | dst | src | | S | Z | HC | P/V | N | CF |
| INDMR<br>do {(HL) ¨ (0,C)<br>B ¨ B - 1<br>C ¨ C - 1<br>HL ¨ HL - 1<br>} while B != 0 | | | ED 9A | 0 | 1 | 0 | 1 | * | 0 |
| INDR<br>do {(HL) ¨ (BC)<br>B ¨ B - 1<br>HL ¨ HL - 1<br>} while B != 0 | | | ED BA | X | 1 | X | X | 1 | - |
| INI<br>(HL) ¨ (BC)<br>B ¨ B - 1<br>HL ¨ HL + 1 | | | ED A2 | X | * | X | X | 1 | - |
| INI2<br>(HL) ¨ (BC)<br>B ¨ B - 1<br>C ¨ C + 1<br>HL ¨ HL + 1 | | | ED 84 | X | * | X | X | 1 | - |
| INI2R<br>do {(HL) ¨ (BC)<br>B ¨ B - 1<br>C ¨ C + 1<br>HL ¨ HL + 1<br>} while B != 0 | | | ED 94 | X | 1 | X | X | 1 | - |
| INIM<br>(HL) ¨ (0,C)<br>B ¨ B - 1<br>C ¨ C + 1<br>HL ¨ HL + 1 | | | ED 82 | * | * | * | P | * | * |
| INIMR<br>do {(HL) ¨ (0,C)<br>B ¨ B - 1<br>C ¨ C + 1<br>HL ¨ HL + 1<br>} while B != 0 | | | ED 92 | 0 | 1 | 0 | 1 | * | 0 |
| INIR<br>do {(HL) ¨ (BC)<br>B ¨ B - 1<br>HL ¨ HL + 1<br>} while B != 0 | | | ED B2 | X | 1 | X | X | 1 | - |
| JP (rr)<br>PC ¨ rr<br>IF .i16 {ADL ¨ 0}<br>ELIF .i32 {ADL ¨ 1} | (HL) | | E9 | - | - | - | - | - | - |

FIG._27E (Table 25 continued)

| Instruction Summary | | | | | | | | | |
|---|---|---|---|---|---|---|---|---|---|
| | Address Mode | | OpCode(s) (Hex) | Flags Affected | | | | | |
| Instruction and Operation | dst | src | | S | Z | HC | P/V | N | CF |
| | (IX/Y) | | DD/FD E9 | | | | | | |
| JP cc,Mmn<br>if cc {<br>  IF .i16 {ADL ¨ 0}<br>  ELIF .i32 {ADL ¨ 1}<br>  PC ¨ mn<br>  IF ADL {PC23-16 ¨ M}} | | | C2-FA | - | - | - | - | - | - |
| JP Mmn<br>IF .i16 {ADL ¨ 0}<br>ELIF .i32 {ADL ¨ 1}<br>PC15-0 ¨ mn<br>IF ADL {PC23-16 ¨ M} | | | C3 | - | - | - | - | - | - |
| JR cc',d<br>if cc' {PC ¨ PC d} | | | 10-38 | - | - | - | - | - | - |
| JR d<br>PC ¨ PC d | | | 18 | - | - | - | - | - | - |
| LD (aa),A<br>(aa) ¨ A | (BC) | | 02 | - | - | - | - | - | - |
| | (DE) | | 12 | | | | | | |
| | (HL) | | 77 | | | | | | |
| | (mn) | | 32 | | | | | | |
| | (IX/Yd) | | DD/FD 77 | | | | | | |
| LD (mn),ee<br>(mn) ¨ ee | | HL | 22 | - | - | - | - | - | - |
| | | ss | ED 43-73 | | | | | | |
| | | IX/Y | DD/FD 22 | | | | | | |
| LD (HL),qq<br>(HL) ¨ qq | | BC,DE,HL | ED 0F-2F | - | - | - | - | - | - |
| | | IX | ED 3F | | | | | | |
| | | IY | ED 3E | | | | | | |
| LD (IX/Yd),qq<br>(IX/Yd) ¨ qq | | BC,DE,HL | DD/FD 0F-2F | - | - | - | - | - | - |
| | | same I | DD/FD 3F | | | | | | |
| | | other I | DD/FD 3E | | | | | | |
| LD A,(aa)<br>A ¨ (aa) | | (BC) | 0A | - | - | - | - | - | - |
| | | (DE) | 1A | | | | | | |
| | | (HL) | 7E | | | | | | |
| | | (mn) | 3A | | | | | | |
| | | (IX/Yd) | DD/FD 7E | | | | | | |
| LD A,I<br>A ¨ I | | | ED 57 | * | * | 0 | IEF2 | 0 | - |
| LD A,MB<br>if ADL, A ¨ MB | | | ED 6E | - | - | - | - | - | - |
| LD A,R<br>A ¨ R | | | ED 5F | * | * | 0 | IEF2 | 0 | - |
| LD ee,mn<br>ee ¨ mn | | ss | 01-31 | - | - | - | - | - | - |

FIG._27F  (Table 25 continued)

Instruction Summary

| Instruction and Operation | Address Mode | | OpCode(s) (Hex) | Flags Affected | | | | | |
|---|---|---|---|---|---|---|---|---|---|
| | dst | src | | S | Z | HC | P/V | N | CF |
| LD ee,(mn)<br>ee ¨ (mn) | IX/Y | | DD/FD 21 | - | - | - | - | - | - |
| | HL | | 2A | | | | | | |
| | ss | | ED 4B-7B | | | | | | |
| | IX/Y | | DD/FD 2A | | | | | | |
| LD I,A<br>I ¨ A | | | ED 47 | - | - | - | - | - | - |
| LD MB,A<br>if ADL, MB ¨ A | | | ED 6D | - | - | - | - | - | - |
| LD q,n<br>q ¨ n | r | | 06-3E | - | - | - | - | - | - |
| | ir | | DD/FD 26/2E | | | | | | |
| | (HL) | | 36 | | | | | | |
| | (IX/Yd) | | DD/FD 36 | | | | | | |
| LD q,r<br>q ¨ r | r' | | 40-7F | - | - | - | - | - | - |
| | ir | | DD/FD 60-6F | | | | | | |
| | (HL) | | 70-77 | | | | | | |
| | (IX/Yd) | | DD/FD 70-77 | | | | | | |
| LD qq,(HL)<br>qq ¨ (HL) | BC,DE,HL | | ED 07-27 | - | - | - | - | - | - |
| | IX | | ED 37 | | | | | | |
| | IY | | ED 31 | | | | | | |
| LD qq,(IX/Yd)<br>qq ¨ (IX/Yd) | BC,DE,HL | | DD/FD 07-27 | - | - | - | - | - | - |
| | same I | | DD/FD 37 | | | | | | |
| | other I | | DD/FD 31 | | | | | | |
| LD R,A<br>R ¨ A | | | ED 4F | - | - | - | - | - | - |
| LD r,s<br>r ¨ s | | r' | 40-7F | - | - | - | - | - | - |
| | rae | ih | DD/FD 44-7C (note 1) | | | | | | |
| | rae | il | DD/FD 45-7D (note 1) | | | | | | |
| | | n | 06-3E | | | | | | |
| | | (HL) | 46-7E | | | | | | |
| | | (IX/Yd) | DD/FD 46-7E | | | | | | |
| LD SP,rr<br>SP ¨ rr | | HL | F9 | - | - | - | - | - | - |
| | | IX/Y | DD/FD F9 | | | | | | |
| LDD<br>(DE) ¨ (HL)<br>DE ¨ DE - 1<br>HL ¨ HL - 1<br>BC ¨ BC - 1 | | | ED A8 | - | - | 0 | notZ | 0 | - |
| LDDR<br>do {(DE) ¨ (HL)<br>DE ¨ DE - 1<br>HL ¨ HL - 1<br>BC ¨ BC - 1 | | | ED B8 | - | - | 0 | 0 | 0 | - |

FIG._27G (Table 25 continued)

| Instruction Summary | | | | | | | | | |
|---|---|---|---|---|---|---|---|---|---|
| | Address Mode | | OpCode(s) (Hex) | Flags Affected | | | | | |
| Instruction and Operation | dst | src | | S | Z | HC | P/V | N | CF |
| } while BC != 0 | | | | | | | | | |
| LDI<br>(DE) ¨ (HL)<br>DE ¨ DE + 1<br>HL ¨ HL + 1<br>BC ¨ BC - 1 | | | ED A0 | - | - | 0 | notZ | 0 | - |
| LDIR<br>do {(DE) ¨ (HL)<br>DE ¨ DE + 1<br>HL ¨ HL + 1<br>BC ¨ BC - 1<br>} while BC != 0 | | | ED B0 | - | - | 0 | 0 | 0 | - |
| LEA qq,IXd<br>qq ¨ IXd | BC,DE,HL | | ED 02-22 | - | - | - | - | - | - |
| | IX | | ED 32 | | | | | | |
| | IY | | ED 55 | | | | | | |
| LEA qq,IYd<br>qq ¨ IYd | BC,DE,HL | | ED 03-23 | - | - | - | - | - | - |
| | IX | | ED 54 | | | | | | |
| | IY | | ED 33 | | | | | | |
| MLT ss<br>ss ¨ ssL * ssH | | | ED 4C-7C | - | - | - | - | - | - |
| NEG<br>A ¨ 0 - A | | | ED 44 | * | * | * | V | 1 | * |
| NOP | | | 00 | - | - | - | - | - | - |
| OR A,s<br>A ¨ A OR s | | r | B0-B7 | * | * | 0 | P | 0 | 0 |
| | | ir | DD/FD B4-B5 | | | | | | |
| | | n | F6 | | | | | | |
| | | (HL) | B6 | | | | | | |
| | | (IX/Yd) | DD/FD B6 | | | | | | |
| OTD2R<br>do {(BC) ¨ (HL)<br>B ¨ B - 1<br>C ¨ C - 1<br>HL ¨ HL - 1<br>} while B != 0 | | | ED BC | X | 1 | X | X | 1 | - |
| OTDM<br>(0,C) ¨ (HL)<br>B ¨ B - 1<br>C ¨ C - 1<br>HL ¨ HL - 1 | | | ED 8B | * | * | * | P | * | * |
| OTDMR<br>do {(0,C) ¨ (HL)<br>B ¨ B - 1<br>C ¨ C - 1<br>HL ¨ HL - 1 | | | ED 9B | 0 | 1 | 0 | 1 | * | 0 |

FIG._27H
(Table 25 continued)

| Instruction Summary |||||||||
|---|---|---|---|---|---|---|---|---|
| | Address Mode || OpCode(s) (Hex) | Flags Affected ||||||
| Instruction and Operation | dst | src | | S | Z | HC | P/V | N | CF |
| } while B != 0 | | | | | | | | | |
| OTDR<br>do {(BC) ¨ (HL)<br>B ¨ B - 1<br>HL ¨ HL - 1<br>} while B != 0 | | | ED BB | X | 1 | X | X | 1 | - |
| OTI2R<br>do {(BC) ¨ (HL)<br>B ¨ B - 1<br>C ¨ C + 1<br>HL ¨ HL + 1<br>} while B != 0 | | | ED B4 | X | 1 | X | X | 1 | - |
| OTIM<br>(0,C) ¨ (HL)<br>B ¨ B - 1<br>C ¨ C + 1<br>HL ¨ HL + 1 | | | ED 83 | * | * | * | P | * | * |
| OTIMR<br>do {(0,C) ¨ (HL)<br>B ¨ B - 1<br>C ¨ C + 1<br>HL ¨ HL + 1<br>} while B != 0 | | | ED 93 | 0 | 1 | 0 | 1 | * | 0 |
| OTIR<br>do {(BC) ¨ (HL)<br>B ¨ B - 1<br>HL ¨ HL + 1<br>} while B != 0 | | | ED B3 | X | 1 | X | X | 1 | - |
| OUT (C),r<br>(BC) ¨ r | | | ED 41-79 | - | - | - | - | - | - |
| OUT (n),A<br>(n) ¨ A | | | D3 | - | - | - | - | - | - |
| OUT0 (n),r<br>(0,n) ¨ r | | | ED 01-39 | - | - | - | - | - | - |
| OUTD<br>(BC) ¨ (HL)<br>B ¨ B - 1<br>HL ¨ HL - 1 | | | ED AB | X | * | X | X | 1 | - |
| OUTD2<br>(BC) ¨ (HL)<br>B ¨ B - 1<br>C ¨ C - 1<br>HL ¨ HL - 1 | | | ED AC | X | * | X | X | 1 | - |
| OUTI<br>(BC) ¨ (HL) | | | ED A3 | X | * | X | X | 1 | - |

FIG. _27I  (Table 25 continued)

| Instruction Summary | | | | | | | | | |
|---|---|---|---|---|---|---|---|---|---|
| | Address Mode | | OpCode(s) (Hex) | Flags Affected | | | | | |
| Instruction and Operation | dst | src | | S | Z | HC | P/V | N | CF |
| B ¨ B - 1<br>HL ¨ HL + 1 | | | | | | | | | |
| OUTI2<br>(BC) ¨ (HL)<br>B ¨ B - 1<br>C ¨ C + 1<br>HL ¨ HL + 1 | | | ED A4 | X | * | X | X | 1 | - |
| PEA IX/Yd<br>SP ¨ SP-2<br>(SP) ¨ IX/Yd | | | ED 65/66 | - | - | - | - | - | - |
| POP pp<br>pp ¨ (SP)<br>SP ¨ SP + 2 | qq | | C1-F1 | (no change unless operand is AF) | | | | | |
| | IX/Y | | DD/FD E1 | | | | | | |
| PUSH pp<br>SP ¨ SP-2<br>(SP) ¨ pp | | qq | C5-F5 | - | - | - | - | - | - |
| | | IX/Y | DD/FD E5 | | | | | | |
| RES b,m<br>m ¨ m and not (2^b) | | r | CB 80-BF | - | - | - | - | - | - |
| | | (HL) | CB 86-BE | | | | | | |
| | | (IX/Yd) | DD/FD CB d 86-BE | | | | | | |
| RET<br>if .16 OR .24 {<br>  newADL ¨ (SPL)<br>  SPL ¨ SPL+1<br>  if !ADL {<br>    if newADL {<br>      PC23-16 ¨ (SPL)<br>      SPL ¨ SPL+1}<br>    PC15-0 ¨ (SPS)<br>    SPS ¨ SPS+2}<br>  else [ADL is 1] {<br>    if newADL {<br>      PC23-0 ¨ (SPL)<br>      SPL ¨ SPL+3<br>    } else {<br>      PC15-0 ¨ (SPL)<br>      SPL ¨ SPL+2}}<br>  ADL ¨ newADL}<br>else [no prefix] {<br>  if ADL {<br>    PC23-0 ¨ (SPL)<br>    SPL ¨ SPL+3<br>  } else {<br>    PC15-0 ¨ (SPS)<br>    SPS ¨ SPS+2}} | | | C9 | - | - | - | - | - | - |

FIG._27J (Table 25 continued)

| Instruction Summary | | | | | | | | | |
|---|---|---|---|---|---|---|---|---|---|
| | Address Mode | | OpCode(s) (Hex) | Flags Affected | | | | | |
| Instruction and Operation | dst | src | | S | Z | HC | P/V | N | CF |
| RET cc<br>if cc {as RET above} | | | C0-F8 | - | - | - | - | - | - |
| RETI<br>as RET above +<br>recognition by Z80<br>peripherals | | | ED 4D | - | - | - | - | - | - |
| RETN<br>as RET above + IEF1 "<br>IEF2 | | | ED 45 | - | - | - | - | - | - |
| RL m 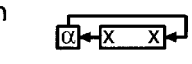<br>(CF,m) " rotL(CF,m) | | r<br>(HL)<br>(IX/Yd) | CB 10-17<br>CB 16<br>DD/FD CB d 16 | * | * | 0 | P | 0 | * |
| RLA 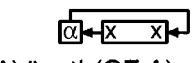<br>(CF,A) " rotL(CF,A) | | | 17 | - | - | 0 | - | 0 | * |
| RLC m 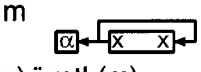<br>(CF,m) " rotL(m) | | r<br>(HL)<br>(IX/Yd) | CB 00-07<br>CB 06<br>DD/FD CB d 06 | * | * | 0 | P | 0 | * |
| RLCA 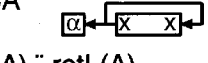<br>(CF,A) " rotL(A) | | | 07 | - | - | 0 | - | 0 | * |
| RLD<br>tmp " A[3:0]<br>A[3:0] " (HL)[7:4]<br>(HL)[7:4] " (HL)[3:0]<br>(HL)[3:0] " tmp | | | ED 6F | * | * | 0 | P | 0 | - |
| RR m 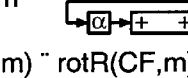<br>(CF,m) " rotR(CF,m) | | r<br>(HL)<br>(IX/Yd) | CB 18-1F<br>CB 1E<br>DD/FD CB d 1E | * | * | 0 | P | 0 | * |
| RRA 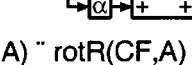<br>(CF,A) " rotR(CF,A) | | r | 1F | - | - | 0 | - | 0 | * |
| RRC m 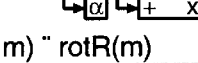<br>(CF,m) " rotR(m) | | r<br>(HL)<br>(IX/Yd) | CB 08-0F<br>CB 0E<br>DD/FD CB d 0E | * | * | 0 | P | 0 | * |
| RRCA 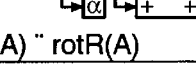<br>(CF,A) " rotR(A) | | | 0F | - | - | 0 | - | 0 | * |
| RRD<br>tmp " (HL)[3:0]<br>(HL)[3:0] " (HL)[7:4]<br>(HL)[7:4] " A[3:0]<br>A[3:0] " tmp | | | ED 67 | * | * | 0 | P | 0 | - |
| RSMIX | | | ED 7E | - | - | - | - | - | - |

FIG._27K (Table 25 continued)

| Instruction and Operation | Address Mode dst | Address Mode src | OpCode(s) (Hex) | S | Z | HC | P/V | N | CF |
|---|---|---|---|---|---|---|---|---|---|
| mix_flag ~ 0 | | | | | | | | | |
| RST p<br>SP ~ SP - 2<br>(SP) ~ PC<br>IF ADL {SPL ~ SPL - 1<br>  (SPL) ~ PC23-0}<br>IF .i16 OR .i24 {<br>  SPL ~ SPL-1<br>  (SPL) ~ ADL<br>  ADL ~ .i16 ? 0 : 1}<br>PC ~ 0,p<br>note p=0,8,10,18,...38H | | | C7-FF | * | * | 0 | P | 0 | - |
| SBC A,s<br>A ~ A - s - CF | | r | 98-9F | * | * | * | V | 1 | * |
| | | ir | DD/FD 9C-9D | | | | | | |
| | | n | DE | | | | | | |
| | | (HL) | 9E | | | | | | |
| | | (IX/Yd) | DD/FD 9E | | | | | | |
| SBC HL,ss<br>HL ~ HL - ss - CF | | r | ED 42-72 | * | * | * | V | 1 | * |
| SCF<br>CF ~ 1 | | | 37 | - | - | 0 | - | 0 | 1 |
| SET b,m<br>m ~ m or (2^b) | | r | CB C0-FF | - | - | - | - | - | - |
| | | (HL) | CB C6-FE | | | | | | |
| | | (IX/Yd) | DD/FD CB d C6-FE | | | | | | |
| SLA m<br>(CF,m) ~ m + m | | r | CB 20-27 | * | * | 0 | P | 0 | * |
| | | (HL) | CB 26 | | | | | | |
| | | (IX/Yd) | DD/FD CB d 26 | | | | | | |
| SLP | | | ED 76 | - | - | - | - | - | - |
| SRA m<br>(m,CF) ~ arith_shR(m) | | r | CB 28-2F | * | * | 0 | P | 0 | * |
| | | (HL) | CB 2E | | | | | | |
| | | (IX/Yd) | DD/FD CB d 2E | | | | | | |
| SRL m<br>(m,CF) ~ logic_shR(m) | | r | CB 38-3F | 0 | * | 0 | P | 0 | * |
| | | (HL) | CB 3E | | | | | | |
| | | (IX/Yd) | DD/FD CB d 3E | | | | | | |
| STMIX<br>mix_flag ~ 1 | | | ED 7D | - | - | - | - | - | - |
| SUB A,s<br>A ~ A - s | | r | 90-97 | * | * | * | V | 1 | * |
| | | ir | DD/FD 94-95 | | | | | | |
| | | n | D6 | | | | | | |
| | | (HL) | 96 | | | | | | |
| | | (IX/Yd) | DD/FD 96 | | | | | | |
| TST A,s<br>A AND s | | r | ED 04-3C | * | * | 1 | P | 0 | 0 |
| | | n | ED 64 | | | | | | |

FIG._27L (Table 25 continued)

| Instruction Summary | | | | | | | | | |
|---|---|---|---|---|---|---|---|---|---|
| | Address Mode | | OpCode(s) (Hex) | Flags Affected | | | | | |
| Instruction and Operation | dst | src | | S | Z | HC | P/V | N | CF |
| | | (HL) | ED 34 | | | | | | |
| TSTIO n (0,C) AND n | | | ED 34 | * | * | 1 | P | 0 | 0 |
| XOR A,s A ¨ A XOR s | | r | A8-AF | * | * | 0 | P | 0 | 0 |
| | | ir | DD/FD AC-AD | | | | | | |
| | | n | EE | | | | | | |
| | | (HL) | AE | | | | | | |
| | | (IX/Yd) | DD/FD AE | | | | | | |
| Notes: Some of the values in this range are used by other instructions, which "override" this range. | | | | | | | | | |

FIG._28A-1

(Table 26) OP CODE MAP (1ST OP CODE)
Horizontal = LOWER NIBBLE, Vertical = UPPER NIBBLE (HEX)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NOP | LD BC,nn | LD (BC),A | INC BC | INC B | DEC B | LD B,n | RLCA | EX AF,AF' | ADD HL,BC | LD A,(BC) | DEC BC | INC C | DEC C | LD C,n | RRCA |
| 1 | DJNZ d | LD DE,nn | LD (DE),A | INC DE | INC D | DEC D | LD D,n | RLA | JR d | ADD HL,DE | LD A,(DE) | DEC DE | INC E | DEC E | LD E,n | RRA |
| 2 | JR NZ,d | LD HL,nn | LD (nn),HL | INC HL | INC H | DEC H | LD H,n | DAA | JR Z,d | ADD HL,HL | LD HL,(nn) | DEC HL | INC L | DEC L | LD L,n | CPL |
| 3 | JR NC,d | LD SP,nn | LD (nn),A | INC SP | INC (HL) | DEC (HL) | LD (HL),n | SCF | JR C,d | ADD HL,SP | LD A,(nn) | DEC SP | INC A | DEC A | LD A,n | CCF |
| 4 | .16.i16 prefix | LD B,C | LD B,D | LD B,E | LD B,H | LD B,L | LD B,(HL) | LD B,A | LD C,B | .24.i24 prefix | LD C,D | LD C,E | LD C,H | LD C,L | LD C,(HL) | LD C,A |
| 5 | LD D,B | LD D,C | .16.i24 prefix | LD D,E | LD D,H | LD D,L | LD D,(HL) | LD D,A | LD E,B | LD E,C | LD E,D | .24.i24 prefix | LD E,H | LD E,L | LD E,(HL) | LD E,A |
| 6 | LD H,B | LD H,C | LD H,D | LD H,E | LD H,H | LD H,L | LD H,(HL) | LD H,A | LD L,B | LD L,C | LD L,D | LD L,E | LD L,H | LD L,L | LD L,(HL) | LD L,A |
| 7 | LD (HL),B | LD (HL),C | LD (HL),D | LD (HL),E | LD (HL),H | LD (HL),L | HALT | LD (HL),A | LD A,B | LD A,C | LD A,D | LD A,E | LD A,H | LD A,L | LD A,(HL) | LD A,A |
| 8 | ADD A,B | ADD A,C | ADD A,D | ADD A,E | ADD A,H | ADD A,L | ADD A,(HL) | ADD A,A | ADC A,B | ADC A,C | ADC A,D | ADC A,E | ADC A,H | ADC A,L | ADC A,(HL) | ADC A,A |
| 9 | SUB A,B | SUB A,C | SUB A,D | SUB A,E | SUB A,H | SUB A,L | SUB A,(HL) | SUB A,A | SBC A,B | SBC A,C | SBC A,D | SBC A,E | SBC A,H | SBC A,L | SBC A,(HL) | SBC A,A |

FIG. 28A-2

(Table 26 continued)

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A | AND A,B | AND A,C | AND A,D | AND A,E | AND A,H | AND A,L | AND A,(HL) | AND A,A | XOR A,B | XOR A,C | XOR A,D | XOR A,E | XOR A,H | XOR A,L | XOR A,(HL) | XOR A,A |
| B | OR A,B | OR A,C | OR A,D | OR A,E | OR A,H | OR A,L | OR A,(HL) | OR A,A | CP A,B | CP A,C | CP A,D | CP A,E | CP A,H | CP A,L | CP A,(HL) | CP A,A |
| C | RET NZ | POP BC | JP NZ,nn | JP nn | CALL NZ,nn | PUSH BC | ADD A,n | RST 0 | RET Z | RET | JP Z,nn | (Table 31) | CALL Z,nn | CALL nn | ADC A,n | RST 8 |
| D | RET NC | POP DE | JP NC,nn | OUT (n),A | CALL NC,nn | PUSH DE | SUB A,n | RST 10H | RET C | EXX | JP C,nn | IN A,(n) | CALL C,nn | (Table 32) | SBC A,n | RST 18H |
| E | RET PO | POP HL | JP PO,nn | EX (SP),HL | CALL PO,nn | PUSH HL | AND A,n | RST 20 | RET PE | JP (HL) | JP PE,nn | EX DE,HL | CALL PE,nn | Table 33 | XOR A,n | RST 28H |
| F | RET P | POP AF | JP P,nn | DI | CALL P,nn | PUSH AF | OR A,n | RST 30H | RET M | LD SP,HL | JP M,nn | EI | CALL M,nn | (Table 34) | CP A,n | RST 38H |

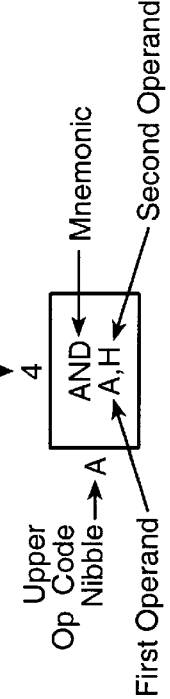

Upper Op Code Nibble → A  
Lower Op Code Nibble → 4  
Mnemonic → AND  
First Operand → A,  
Second Operand → H Notes:
1. n = 8-bit data
2. nn = 16-bit addr or data
3. d = signed 8-bit displacement

FIG. 29A-1

(Table 27) OP CODE MAP (2nd OP AFTER 0CBH)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | RLC B | RLC C | RLC D | RLC E | RLC H | RLC L | RLC (HL) | RLC A | RRC B | RRC C | RRC D | RRC E | RRC H | RRC L | RRC (HL) | RRC A |
| 1 | RL B | RL C | RL D | RL E | RL H | RL L | RL (HL) | RRCA | RR B | RR C | RR D | RR E | RR H | RR L | RR (HL) | RR A |
| 2 | SLA B | SLA C | SLA D | SLA E | SLA H | SLA L | SLA (HL) | SLA A | SRA B | SRA C | SRA D | SRA E | SRA H | SRA L | SRA (HL) | SRA A |
| 3 | | | | | | | | | SRL B | SRL C | SRL D | SRL E | SRL H | SRL L | SRL (HL) | SRL A |
| 4 | BIT 0,B | BIT 0,C | BIT 0,D | BIT 0,E | BIT 0,H | BIT 0,L | BIT 0,(HL) | BIT 0,A | BIT 1,B | BIT 1,C | BIT 1,D | BIT 1,E | BIT 1,H | BIT 1,L | BIT 1,(HL) | BIT 1,A |
| 5 | BIT 2,B | BIT 2,C | BIT 2,D | BIT 2,E | BIT 2,H | BIT 2,L | BIT 2,(HL) | BIT 2,A | BIT 3,B | BIT 3,C | BIT 3,D | BIT 3,E | BIT 3,H | BIT 3,L | BIT 3,(HL) | BIT 3,A |
| 6 | BIT 4,B | BIT 4,C | BIT 4,D | BIT 4,E | BIT 4,H | BIT 4,L | BIT 4,(HL) | BIT 4,A | BIT 5,B | BIT 5,C | BIT 5,D | BIT 5,E | BIT 5,H | BIT 5,L | BIT 5,(HL) | BIT 5,A |
| 7 | BIT 6,B | BIT 6,C | BIT 6,D | BIT 6,E | BIT 6,H | BIT 6,L | BIT 6,(HL) | BIT 6,A | BIT 7,B | BIT 7,C | BIT 7,D | BIT 7,E | BIT 7,H | BIT 7,L | BIT 7,(HL) | BIT 7,A |
| 8 | RES 0,B | RES 0,C | RES 0,D | RES 0,E | RES 0,H | RES 0,L | RES 0,(HL) | RES 0,A | RES 1,B | RES 1,C | RES 1,D | RES 1,E | RES 1,H | RES 1,L | RES 1,(HL) | RES 1,A |
| 9 | RES 2,B | RES 2,C | RES 2,D | RES 2,E | RES 2,H | RES 2,L | RES 2,(HL) | RES 2,A | RES 3,B | RES 3,C | RES 3,D | RES 3,E | RES 3,H | RES 3,L | RES 3,(HL) | RES 3,A |

FIG._29A-2

(Table 27 continued)

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A | RES 4,B | RES 4,C | RES 4,D | RES 4,E | RES 4,H | RES 4,L | RES 4,(HL) | RES 4,A | RES 5,B | RES 5,C | RES 5,D | RES 5,E | RES 5,H | RES 5,L | RES 5,(HL) | RES 5,A |
| B | RES 6,B | RES 6,C | RES 6,D | RES 6,E | RES 6,H | RES 6,L | RES 6,(HL) | RES 6,A | RES 7,B | RES 7,C | RES 7,D | RES 7,E | RES 7,H | RES 7,L | RES 7,(HL) | RES 7,A |
| C | SET 0,B | SET 0,C | SET 0,D | SET 0,E | SET 0,H | SET 0,L | SET 0,(HL) | SET 0,A | SET 1,B | SET 1,C | SET 1,D | SET 1,E | SET 1,H | SET 1,L | SET 1,(HL) | SET 1,A |
| D | SET 2,B | SET 2,C | SET 2,D | SET 2,E | SET 2,H | SET 2,L | SET 2,(HL) | SET 2,A | SET 3,B | SET 3,C | SET 3,D | SET 3,E | SET 3,H | SET 3,L | SET 3,(HL) | SET 3,A |
| E | SET 4,B | SET 4,C | SET 4,D | SET 4,E | SET 4,H | SET 4,L | SET 4,(HL) | SET 4,A | SET 5,B | SET 5,C | SET 5,D | SET 5,E | SET 5,H | SET 5,L | SET 5,(HL) | SET 5,A |
| F | SET 6,B | SET 6,C | SET 6,D | SET 6,E | SET 6,H | SET 6,L | SET 6,(HL) | SET 6,A | SET 7,B | SET 7,C | SET 7,D | SET 7,E | SET 7,H | SET 7,L | SET 7,(HL) | SET 7,A |

FIG._29A

| FIG._29A-1 | FIG._29A-2 |

FIG._29B

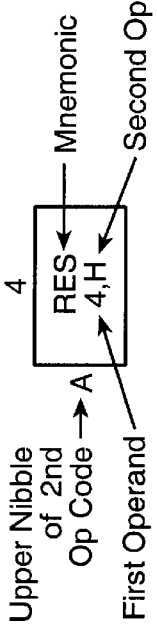

FIG. 30A-1 (Table 28) OP CODE MAP (2nd OP CODE AFTER 0DDH)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | | | | ADD IX,BC | | | | | | |
| 1 | | LD IX,nn | LD (nn),IX | INC IX | INC IXH | DEC IXH | LD IXH,n | | | ADD IX,DE | | | | | | |
| 2 | | LD IY,(IXd) | | | INC (IXd) | DEC (IXd) | LD (IX d),n | | | ADD IX,IX | LD IX,(nn) | DEC IX | INC IXL | DEC IXL | LD IXL,n | LD (IX d),IY |
| 3 | | | | | | | | | | ADD IX,SP | | | | | | |
| 4 | | LD IXH,C | LD IXH,D | LD IXH,E | LD B,IXH | LD B,IXL | LD B,(IXd) | LD BC,(IXd) | LD IXL,B | LD IXL,C | LD IXL,D | LD IXL,E | LD C,IXH | LD C,IXL | LD C,(IXd) | LD (IX d),BC |
| 5 | | LD (IX d),D | LD IXH,D | LD IXH,E | LD D,IXH | LD D,IXL | LD D,(IXd) | LD DE,(IXd) | | | | | LD E,IXH | LD E,IXL | LD E,(IXd) | LD (IX d),DE |
| 6 | | LD (IX d),C | | LD IXH,E | LD IXH,H | LD IXH,L | LD H,(IXd) | LD HL,(IXd) | LD IXL,B | LD IXL,C | LD IXL,D | LD IXL,E | LD IXL,H | LD IXL,L | LD L,(IXd) | LD (IX d),HL |
| 7 | | LD (IXd),C | LD (IX d),D | LD (IX d),E | LD (IX d),H | LD (IX d),L | | LD (IX d),A | | | | | LD A,IXH | LD A,IXL | LD A,(IXd) | LD (IX d),IX |
| 8 | | | | | ADD A,IXH | ADD A,IXL | ADD A,(IXd) | | | | | | ADC A,IXH | ADC A,IXL | ADC A,(IXd) | |
| 9 | | | | | SUB A,IXH | SUB A,IXL | SUB A,(IXd) | | | | | | SBC A,IXH | SBC A,IXL | SBC A,(IXd) | |

FIG._30A-2 (Table 28 continued)
|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A |   |   |   |   | AND A,IXH | AND A,IXL | AND A,(IXd) |   |   |   |   |   | XOR A,IXH | XOR A,IXL | XOR A,(IXd) |   |
| B |   |   |   |   | OR A,IXH | OR A,IXL | OR A,(IXd) |   |   |   |   |   | CP A,IXH | CP A,IXL | CP A,(IXd) |   |
| C |   |   |   |   |   |   |   |   |   |   |   | (Table 35) |   |   |   |   |
| D |   |   |   |   |   |   |   |   |   |   |   |   |   |   |   |   |
| E |   | POP IX |   | EX (SP),IX |   | PUSH IX |   |   |   | JP (IX) |   |   |   |   |   |   |
| F |   |   |   |   |   |   |   |   |   | LD SP,IX |   |   |   |   |   |   |
Notes:
1. n = 8-bit data
2. nn = 16-bit addr or data
3. d = signed 8-bit displacement
FIG._30A | FIG._30A-1 | FIG._30A-2
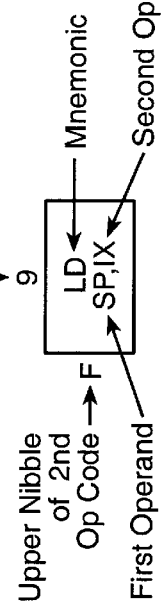
FIG._30B

FIG. 31A-1

(Table 29) OP CODE MAP (2nd OP AFTER 0EDH)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | IN0 B,(n) | OUT0 (n),B | LEA BC, IXd | LEA BC, IYd | TST A,B | | | | IN0 C,(n) | OUT0 (n),C | | | TST A,C | | | LD (HL), BC |
| 1 | IN0 D,(n) | OUT0 (n),D | LEA DE, IXd | LEA DE, IYd | TST A,D | | | LD BC, (HL) | IN0 E,(n) | OUT0 (n),E | | | TST A,E | | | LD (HL), DE |
| 2 | IN0 H,(n) | OUT0 (n),H | LEA HL, IXd | LEA HL, IYd | TST A,H | | | LD DE, (HL) | IN0 L,(n) | OUT0 (n),L | | | TST A,L | | | LD (HL), HL |
| 3 | IN0 F,(n) | LD IY, (HL) | LEA IX, IXd | LEA IY, IYd | TST A,(HL) | | | LD HL, (HL) | IN0 A,(n) | OUT0 (n),A | | | TST A,A | | LD (HL), IY | LD (HL), IX |
| 4 | IN B,(C) | OUT (C),B | SBC HL,BC | LD (nn),BC | NEG | RETN | IM 0 | LD IX, (HL) | IN C,(C) | OUT (C),C | ADC HL,BC | LD BC,(nn) | MLT BC | RETI | | LD R,A |
| 5 | IN D,(C) | OUT (C),D | SBC HL,DE | LD (nn),DE | LEA IX, IYd | LEA IY, IXd | IM 1 | LD A,I | IN E,(C) | OUT (C),E | ADC HL,DE | LD DE,(nn) | MLT DE | | IM 2 | LD A,R |
| 6 | IN H,(C) | OUT (C),H | SBC HL,HL | LD (nn),HL | TST A,n | PEA IXd | PEA IYd | RRD | IN L,(C) | OUT (C),L | ADC HL,HL | LD HL,(nn) | MLT HL | LD MB,A | LD A,MB | RLD |

FIG. 31A-2

(Table 29 continued)

|   | 0 | 1 | 2 SBC HL,SP | 3 LD (nn),SP | 4 TSTIO n | 5 | 6 SLP | 7 IN F,(C) | 8 IN A,(C) | 9 OUT (C),A | A ADC HL,SP | B LD SP,(nn) | C MLT SP | D STMIX | E RSMIX | F |
|---|---|---|---|---|---|---|---|---|---|---|---|---|---|---|---|---|
| 7 |   |   |   |   |   |   |   |   |   |   |   |   |   |   |   |   |
| 8 |   |   | INIM | OTIM | INI2 |   |   |   |   |   | INDM | OTDM | IND2 |   |   |   |
| 9 |   |   | INIMR | OTIMR | INI2R |   |   |   |   |   | INDMR | OTDMR | IND2R |   |   |   |
| A |   | LDI | INI | OUTI |   |   |   |   | LDD | CPD |  IND | OUTD | OUTD2 |   |   |   |
| B |   | CPI | INIR | OTIR |   |   |   |   |   | CPDR |   |   |   |   |   |   |
| B |   | LDIR |   |   | OTI2R |   |   |   | LDDR | CPDR | INDR | OTDR | OTD2R |   |   |   |
| C |   |   |   |   |   |   |   |   |   |   |   |   |   |   |   |   |
| D |   |   |   |   |   |   |   |   |   |   |   |   |   |   |   |   |
| E |   |   |   |   |   |   |   |   |   |   |   |   |   |   |   |   |
| F |   |   |   |   |   |   |   |   |   |   |   |   |   |   |   |   |

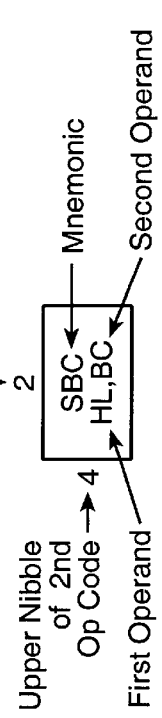

FIG. 31B

Upper Nibble of 2nd Op Code → 4
Lower Nibble of 2nd Op Code → 2
SBC ← Mnemonic
HL,BC
First Operand / Second Operand

FIG._32A-1

(Table 30) OP CODE MAP (2nd OP AFTER 0FDH)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | | | | ADD IY,BC | | | | | | LD (IYd),BC |
| 1 | | LD IY,nn | LD (nn),IY | INC IY | | | | | | ADD IY,DE | | | | | | LD (IYd),DE |
| 2 | | | | | INC IYH | DEC IYH | LD IYH,n | LD HL,(IYd) | | ADD IY,IY | LD IY,(nn) | DEC IY | INC IYL | DEC IYL | LD IYL,n | LD (IYd),HL |
| 3 | | LD IX,(IYd) | | | INC (IYd) | DEC (IYd) | LD (IYd),n | LD IY,(IYd) | | ADD IY,SP | | | | | LD (IYd),IX | LD (IYd),IY |
| 4 | | | | | LD B,IYH | LD B,IYL | LD B,(IYd) | | | | | | LD C,IYH | LD C,IYL | LD C,(IYd) | |
| 5 | | | | | LD D,IYH | LD D,IYL | LD D,(IYd) | | | | | | LD E,IYH | LD E,IYL | LD E,(IYd) | |
| 6 | LD IYH,B | LD IYH,C | LD IYH,D | LD IYH,E | LD IYH,H | LD IYH,L | LD H,(IYd) | LD IYH,A | LD IYL,B | LD IYL,C | LD IYL,D | LD IYL,E | LD IYL,H | LD IYL,L | LD L,(IYd) | LD IYL,A |
| 7 | LD (IYd),B | LD (IYd),C | LD (IYd),D | LD (IYd),E | LD (IYd),H | LD (IYd),L | | LD (IYd),A | | | | | | | | |
| 8 | | | | | ADD A,IYH | ADD A,IYL | ADD A,(IYd) | | | | | | ADC A,IYH | ADC A,IYL | ADC A,(IYd) | |
| 9 | | | | | SUB A,IYH | SUB A,IYL | SUB A,(IYd) | | | | | | SBC A,IYH | SBC A,IYL | SBC A,(IYd) | |

(Table 30 continued)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A | | | | | AND A,IYH | AND A,IYL | AND A, (IYd) | | | | | | XOR A,IYH | XOR A,IYL | XOR A, (IYd) | |
| B | | | | | OR A,IYH | OR A,IYL | OR A, (IYd) | | | | | | CP A,IYH | CP A,IYL | CP A, (IYd) | |
| C | | | | | | | | | | | | (Table 36) | | | | |
| D | | | | | | | | | | | | | | | | |
| E | | POP IY | | EX (SP),IY | | PUSH IY | | | | JP (IY) | | | | | | |
| F | | | | | | | | | | LD SP,IY | | | | | | |

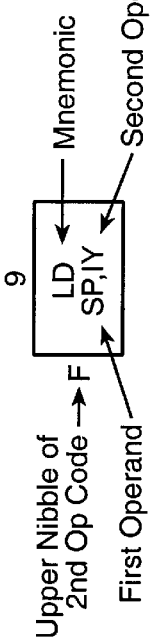

Lower Nibble of 2nd Op Code → 9

Upper Nibble of 2nd Op Code → F

LD SP,IY

↓ Mnemonic
← Second Operand
← First Operand

FIG._32B

FIG._33A
(Table 31) OP CODE MAP (4th BYTE, AFTER 0DDH, 0CBH, AND D)
|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | RLC (IXd) | | | | | | | | RRC (IXd) | |
| 1 | | | | | | | RL (IXd) | | | | | | | | RR (IXd) | |
| 2 | | | | | | | SLA (IXd) | | | | | | | | SRA (IXd) | |
| 3 | | | | | | | | | | | | | | | SRL (IXd) | |
| 4 | | | | | | | BIT 0, (IXd) | | | | | | | | BIT 1, (IXd) | |
| 5 | | | | | | | BIT 2, (IXd) | | | | | | | | BIT 3, (IXd) | |
| 6 | | | | | | | BIT 4, (IXd) | | | | | | | | BIT 5, (IXd) | |
| 7 | | | | | | | BIT 6, (IXd) | | | | | | | | BIT 7, (IXd) | |
| 8 | | | | | | | RES 0, (IXd) | | | | | | | | RES 1, (IXd) | |
| 9 | | | | | | | RES 2, (IXd) | | | | | | | | RES 3, (IXd) | |
| A | | | | | | | RES 4, (IXd) | | | | | | | | RES 5, (IXd) | |
| B | | | | | | | RES 6, (IXd) | | | | | | | | RES 7, (IXd) | |
| C | | | | | | | SET 0, (IXd) | | | | | | | | SET 1, (IXd) | |
| D | | | | | | | SET 2, (IXd) | | | | | | | | SET 3, (IXd) | |
| E | | | | | | | SET 4, (IXd) | | | | | | | | SET 5, (IXd) | |
| F | | | | | | | SET 6, (IXd) | | | | | | | | SET 7, (IXd) | |
|   | 0 | 1 | 2 | 3 | 4 | 5 | 6 | 7 | 8 | 9 | A | B | C | D | E | F |
FIG._33B
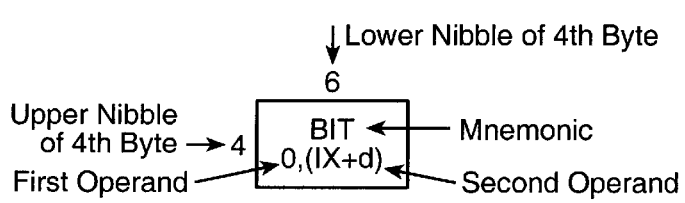

(Table 32) OP CODE MAP (4th BYTE, AFTER 0FDH, 0CBH, AND D)
|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | RLC (IYd) | | | | | | | | RRC (IYd) | |
| 1 | | | | | | | RL (IYd) | | | | | | | | RR (IYd) | |
| 2 | | | | | | | SLA (IYd) | | | | | | | | SRA (IYd) | |
| 3 | | | | | | | | | | | | | | | SRL (IYd) | |
| 4 | | | | | | | BIT 0, (IYd) | | | | | | | | BIT 1, (IYd) | |
| 5 | | | | | | | BIT 2, (IYd) | | | | | | | | BIT 3, (IYd) | |
| 6 | | | | | | | BIT 4, (IYd) | | | | | | | | BIT 5, (IYd) | |
| 7 | | | | | | | BIT 6, (IYd) | | | | | | | | BIT 7, (IYd) | |
| 8 | | | | | | | RES 0, (IYd) | | | | | | | | RES 1, (IYd) | |
| 9 | | | | | | | RES 2, (IYd) | | | | | | | | RES 3, (IYd) | |
| A | | | | | | | RES 4, (IYd) | | | | | | | | RES 5, (IYd) | |
| B | | | | | | | RES 6, (IYd) | | | | | | | | RES 7, (IYd) | |
| C | | | | | | | SET 0, (IYd) | | | | | | | | SET 1, (IYd) | |
| D | | | | | | | SET 2, (IYd) | | | | | | | | SET 3, (IYd) | |
| E | | | | | | | SET 4, (IYd) | | | | | | | | SET 5, (IYd) | |
| F | | | | | | | SET 6, (IYd) | | | | | | | | SET 7, (IYd) | |
|   | 0 | 1 | 2 | 3 | 4 | 5 | 6 | 7 | 8 | 9 | A | B | C | D | E | F |
FIG._34A
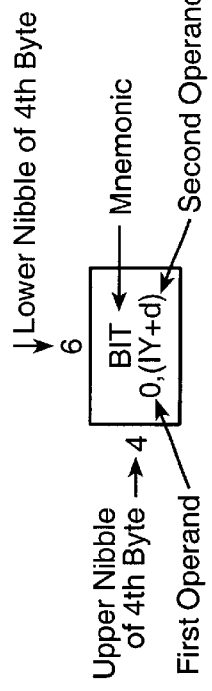
FIG._34B

METHOD AND APPARATUS FOR AN ENHANCED PROCESSOR

FIELD OF THE INVENTION

The present invention is in the field of methods and devices for digital processors and processor cores. More specifically, the present invention is directed to an enhanced processor that maintains backwards compatibility with a number of earlier designs in the same family, including earlier processors with different address space and data widths.

BACKGROUND OF THE INVENTION

A large literature exists regarding the history of processor development and evolution. A brief summary of this history is presented below. The reader is referred to infopad.eecs.berkeley.edu/CIC /archive/cpu__history.html and its cited documents for more information.

While processors have evolved dramatically over the last several decades, in many design applications and environments there remains an extensive interest in utilizing mature processor designs. Older designs have the advantage of a well-designed tool set, a large base of engineering expertise and familiarity, and in some cases a large investment in software code.

The Z-80 processor is one older processor design in which there remains a large interest. The Z-80 was originally developed to be a successor to the Intel 8080 and was regarded at the time as a vast improvement. Like the 8080, the Z-80 used 8 bit data and 16 bit addressing. The Z-80 could execute all of the 8080 instructions and included 80 additional instructions (1, 4, 8 and 16 bit operations and block move and block I/O). The register set was doubled from the 8080, with two banks of data registers (including A and F) that could be switched between. This allowed fast operating system or interrupt context switches. The Z-80 also added two index registers (IX and IY) and 2 types of relocatable vectored interrupts (direct or via the 8-bit I register). Aspects of the Z80 are described in U.S. patent application No. 4,332,008.

One characteristic that made the Z-80 popular in designs was the memory interface—the CPU generated its own RAM refresh signals, which meant easier design and lower system cost, the deciding factor in its selection for the Radio Shack TRS-80 Model 1, introduced on Aug. 3, 1977.

Like many processors, the Z-80 featured many undocumented instructions. In some cases, they were a by-product of early designs (which did not trap invalid op codes, but tried to interpret them as best they could), and in other cases chip area near the edge was used for added instructions, but fabrication made the failure rate high. Instructions that often failed were not documented, increasing chip yield. Later fabrication made these more reliable.

After its introduced, many variants of the Z-80 were developed and produced by a variety of manufacturers. A number of these processors were sold with peripheral components included on-chip. More recently, Z80 family processors are developed and distributed as soft-core specifications in a register transfer language (RTL), which can then be combined with other components to produce ASICs.

Hitachi produced the 64180 (1984) with added components (two 16 bit timers, two DMA controllers, three serial ports, and a segmented MMU mapping a 20 bit (1M) address space to any three variable sized segments in the 16 bit (64K) Z-80 memory map).

Zilog produced the Z-180, compatible with Z-80 peripheral chips, plus variants (Z-181, Z-182). The Z-280 was a 16 bit version introduced about July, 1987, with a paged (like Z-180) 24 bit (16M) MMU (8 or 16 bit bus resizing), user/supervisor modes and features for multitasking, a 256 byte (4-way) cache, 4 channel DMA, and a large number of new op codes added (total of almost 3,500, including previously undocumented Z-80 instructions).

A 16/32 bit Z-380 version also exists (1994) with an added 32-bit linear addressing mode that is not Z-80 compatible.

Z380

Another addition to the Z80 family is the Z380. While the Z380 was intended as an advanced 32-bit version of the Z80, with 16 Mb linear addressing, the processor had mixed results. One problem was that Z80 binary code could not run on the 380 without recompiling, therefore Z380 systems were not "turn-key" compatible with software written for the Z80. A further difficulty is that the Z380 mechanisms for extending the capabilities of the Z80 and Z180, while maintaining binary program compatibility, were inconvenient for both assembly-language programmers and C compiler writers, and expanded the code space requirements for both kinds of programs. The Z380's multi-byte op-code prefixes meant that every time a 24- or 32-bit address or data value was used in an instruction, the instruction not only had to extend by the necessary 8 or 16 bits, but by another 16 bits of "DDIR prefix" as well. This has proved to be linear addressing and wider data at too high a price in code size.

Despite all the further developments made in mP design since 1977, there remains continuing interest in Z80-based processing. For many computer control applications, Z80 processing remains a versatile, reliable and inexpensive solution. As a result of this continued interest, a substantial body of tools and support components for the Z80, including emulators, compilers, etc. continues to be distributed. See, for example, the resources listed at www.geocities.com/SiliconValley/Peaks/3938/z80__home.htm.

Zilog, Inc., continues to produce a sell a number processors in the Z80 family. A brief comparison of the features of these processors is presented in the table below. Further information is available at http://www.zilog.com/resources/z80r.html.

Z80/Z180/Z380 Comparison

| | Z80 | Z180 | Z380 |
|---|---|---|---|
| External Data Bus Width | 8-bit | 8-bit | 16/32-bit |
| Address Space | 64k | 1 Mb | 16 Mb Linear |
| Number of register sets | 2 | 2 | 8 16-bit |
| Number of register planes | 1 | 1 | 4 |
| Static core | no | yes | yes |
| CPU Speed | 10 | 33 | 33 |
| Clocks/Inst. Min | 4 | 3 | 2 |

Memory Management

An important enhancement in processor design is the ability to address a large address space. The address space is determined by the number of bits the processor can manipulate and output as an address Most 8 bit processors are limited to addressing 64k of memory, using two 8-bit words to address each memory location. A 16 bit CPU generally can support 1 to 16 Mb of memory. To support these larger address spaces, the processes generally utilize a memory management unit (MMU) to access an address space larger than 64k, but still maintain compatibility with earlier instruction sets. Under one MMU scheme, all instructions, in all modes, issue 16 bit addresses. The MMU converts these 16 bit addresses to 20 bits.

In such a scheme, physical memory generally refers to the entire universe of memory addressable by the processor. The memory that can be addressed with any one map, or configuration, of the MMU is called the logical address space. In this scheme, every address generated by a user's program is a logical address and the MMU's role is to translate these logical addresses into physical ones. On power up, the MMU may translate every logical address to exactiy the same physical address (which simulates the Z80).

In an MMU scheme, address references made by a program is passed through the MMU before being presented to the physical memory space. If the address matches a range previously programmed into the MMU, then the MMU will add an offset to that address, forming the physical address.

Exd Z80

A number of years ago, Zilog purchased the exclusive rights to the Exd Z80 softcore. One advantage of the ExdZ80 was its single clock bus cycles. As implemented and marketed, the core was "pure" Z80, even including hidden Z80 instructions from 1975.

While the Z180 family has long advertised 20-bit address capability, its mechanism for achieving this, called the Memory Management Unit or MMU, is difficult to use and has impeded the use of this family into larger-scale applications. One would like to add a 24-bit mode in which the processor automatically fetches longer addresses and data, so that no prefix is required for most instructions.

What is needed is a processor "between" the Z18x and Z38x families, that provides 24-bit linear addressing, is more natural and convenient to program than the MMU or 380, and allows more compact programs than the 380.

SUMMARY OF THE INVENTION

The present invention is a controller for executing instructions. A controller according to the invention may exist in a wide variety of embodiments, including, but not limited to, an integrated circuit, a part of an integrated circuit, a "soft-core" RTL descriptor language module, etc.

In one specific embodiment, a controller according to the invention is designed to maximize compatibility with Z80 and 18x applications at the binary level, while simultaneously minimizing code space and maximizing programming convenience for upgrades and new applications that utilize 24-bit operation.

According to a further embodiment, an instruction set for a controller is basically that of the Z18x family, with some optional new facilities to enable 24-bit addresses and data and further provides a Z80 derivative with 24-bit linear addressing and 24-bit ALU, but an external 8-bit data path.

In a further embodiment, the present invention provides a mP or mP core with multiple modes of memory addressing. These modes are designed to allow for backwards compatibility with legacy processor code. According to the present invention, these modes can operationally coexist, with processes written for different modes sharing the processor under control of a supervising or kernel process.

In a specific embodiment, these modes consist of at least five key modes, which may may be referred to as:

| | |
|---|---|
| Native Z80 | First 64K of memory; |
| Virtual Z80 | Any 64K of memory, |
| Native 8180 | First 1M of memory (Uses MMU only) |
| Virtual 8180 | Any 1M of memory (Uses MMU plus MBASE register.); |
| ADL (Address Data Long) Mode | 16 M "linear addressed" memory space. |

Note that while specific memory address space sizes are given above, the invention may in other embodiments have different memory space sizes.

In one specific embodiment, the invention can include an autonomous Multiply/Accumulator Engine (MAC). This engine is optimized to perform sum-of-products (SOP) operations with little CPU overhead, making the invention capable of more effectively handling a number of processing tasks, particularly tasks related to digitalsignal processing (DSP).

A further understanding of the invention can be had from the detailed discussion of specific embodiments below. For purposes of clarity, this discussion refers to devices, methods, and concepts in terms of specific examples. However, the method of the present invention may operate within a variety of types of logical devices. It is therefore intended that the invention not be limited except as provided in the attached claims.

Furthermore, it is well knowvn in the art that logic systems can include a wide variety of different components and different functions in a modular fashion. Different embodiments of a system can include different mixtures of elements and functions and may group various functions as parts of various elements. For purposes of clarity, the invention is described in terms of systems that include many different innovative components and innovative combinations of components. No inference should be taken to limit the invention to combinations containing all of the innovative components listed in any illustrative embodiment in this specification.

All publications, patents, and patent applications cited or listed herein are hereby incorporated by reference in their entirety for all purposes. The invention will be better understood with reference to the following drawings and detailed description.

BRIEF DESCRIPTION OF THE DRAWINGS

FIG. 1 is a block diagram of a processor according to an embodiment of the invention.

FIG. 2 is a block diagram showing pinout of an example processor according to an embodiment of the invention.

FIG. 3 (Table 1) indicates operation of CALL Instruction according to an embodiment of the invention.

FIGS. 4, 4A, 4B (Table 2) indicate operation of RST et al according to an embodiment of the invention.

FIG. 5 (Table 3) indicates which prefix selection affects each (class of) instruction according to an embodiment of the invention.

FIG. 6 (Table 4) indicates register loading to enable a MAC status according to an embodiment of the invention.

FIG. 7 (Table 5) indicates bits indicating MAC status according to an embodiment of the invention.

FIG. 8 (Table 6) indicates State of IEF1 and IEF2 according to an embodiment of the invention.

FIGS. 9, 9A, 9B (Table 7) indicate Processor and Device Pin Descriptions according to an embodiment of the invention.

FIG. 10 (Table 8) indicates Common Base Register (0038H) CBR according to an embodiment of the invention.

FIG. 11 (Table 9) indicates Bank Base Register (0039H) BBR according to an embodiment of the invention.

FIG. 12 (Table 10) indicates Common/Bank Area Register (003AH) CBAR according to an embodiment of the invention.

FIG. 13 (Table 11) indicates Load Instructions according to an embodiment of the invention.

FIG. 14 (Table 12) indicates Arithmetic Instructions according to an embodiment of the invention.

FIG. 15 (Table 13) indicates Logical Instructions according to an embodiment of the invention.

FIG. 16 (Table 14) indicates Exchange Instructions according to an embodiment of the invention.

FIG. 17 (Table 15) indicates Program Control Instructions according to an embodiment of the invention.

FIG. 18 (Table 16) indicates Bit Manipulation Instructions according to an embodiment of the invention.

FIG. 19 (Table 17) indicates Block Transfer Instructions according to an embodiment of the invention.

FIG. 20 (Table 18) indicates Rotate and Shift Instructions according to an embodiment of the invention.

FIG. 21 (Table 19) indicates Input/Output Instructions according to an embodiment of the invention.

FIG. 22 (Table 20) indicates Processor Control Instructions according to an embodiment of the invention.

FIG. 23 (Table 21) indicates Flag Register according to an embodiment of the invention.

FIG. 24 (Table 22) indicates Flag Settings Definitions according to an embodiment of the invention.

FIG. 25 (Table 23) indicates Condition Codes according to an embodiment of the invention.

FIGS. 26A, 26B (Table 24) indicate Instruction Summary according to an embodiment of the of the invention.

FIGS. 27, 27A–27L (Table 25) indicates Op Code Map (1st Op Code) according to an embodiment of the invention.

FIGS. 28A, 28A-1, 29A-2 (Table 26) indicates Op Code Map (1st Op Code) according to an embodiment of the invention.

FIG. 28B shows the organization of the table of FIG. 28A.

FIGS. 29A, 29A-1, 29A-2 (Table 27) indicate Op Code Map (2nd Op Code after OCBH) according to an embodiment of the invention.

FIG. 29B shows the organization of the table of FIG. 29A.

FIGS. 30A, 30A-1, 30A-2 (Table 28) indicate Op Code Map (2nd Op Code After ODDH) according to an embodiment of the invention.

FIG. 30B shows the organization of the table of FIG. 30A.

FIGS. 31A, 31A-1, 31A-2 (Table 29) indicate Op Code Map (2nd Op Code After OBDH) according to an embodiment of the invention.

FIG. 31B shows the organization of the table of FIG. 31A.

FIGS. 32A, 32A-1, 32A-2 (Table 30) indicate Op Code Map (2nd Op Code After 0FDH) according to an embodiment of the invention.

FIG. 32B shows the organization of the table of FIG. 32A.

FIG. 33A (Table 31) indicates Op Code Map (4th Byte, after 0DDH, 0CBH, and d) according to an embodiment of the invention.

FIG. 33B shows the organization of the table of FIG. 33A.

FIG. 34A (Table 32) indicates Op Code Map (4th Byte, after 0FDH, 0CBH, and d) according to an embodiment of the invention.

FIG. 34B shows the organization of the table of FIG. 34A

DESCRIPTION OF SPECIFIC EMBODIMENTS

As is known in the art, a controller according to the invention can be selected with various configurations and capabilities. A large number of specific operations will now be described. It should be understood that a controller according to the invention can include or not include various of these components and modes of operation and the description of specific embodiments here should inot be taken as limiting of the claimed invention.

According to a further embodiment, the invention can provide a processor with a a 24-bit mode having an Interrupt service routine that operates consistently, regardless of the mode and context of the code that was interrupted and is able to restore a mode and context upon completion of interrupt processing.

According to a further embodiment, the invention is able to be used with a master process, i.e. an operating system, Real Time Executive Programs, or kernel, that itself operates in 24-bit mode, while supervising the operation of multiple processes (e.g. programs/routines/tasks) where some of the supervised processes were originally written for the legacy Z80 or Z18x processor and run in one of the other four modes.

Addressing

One major mode bit, called ADL (or Address Data Long), determines the operation of the EZ80 with respect to 16 vs. 24 bit addresses and data. When ADL is 0, address bits A23-16 are normally taken from the output of the Z18x MMU with 4 high order zeroes, plus the contents of a new 8-bit register called MBASE. Both ADL and MBASE are cleared to zero by Reset. In one embodiment, MBASE can only be written when ADL is 1, thus avoiding problems with changing MBASE "on the fly" i.e. while MBASE is being used.

When a program or task operates with ADL=0 and doesn't use the MMU (e.g., a Z80 program or task), MBASE directly selects a 64K byte block of memory in which the program or task operates.

Registers PC, SPL, BC, DE, HL, IX, IY, BC', DE', and HL' are extended from 16 to 24 bits for 24 bit operation as are the associated data paths and ALU. When ADL is 1, address pins A23-16 are normally taken from these register extensions, as described in the next section.

There are two SP (stack pointer) registers, called SPS (short) and SPL (long). SPS includes only 16 bits, and is used as SP (with the MMU and MBASE) when ADL is 0 or when a 16-bit prefix precedes an instruction (when the assembler opcode is suffixed with "0.16"). Values pushed and popped via SPS are always 16 bits.

SPL includes 24 bits, and is used as SP when ADL is 1 or when a 0.24 prefix precedes an instruction. Most values pushed and popped via SPL are 24 bits.

For most instructions that are affected by ADL as described in the next section, instruction prefixes can be used to override ADL without affecting its long-term state.

Instructions and sequences affected by ADL

If ADL is 1, A23-16 for instruction fetches come from bits 23-16 of the Program Counter, while if ADL is 0, these bits come from the MMU and/or the MBASE register. There is no override facility for this choice.

Indirect Resister Addressing

LD r,(HL/IX+d/IY+d)

LD (HL/IX+d/IY+d),r

LD (HL/IX+d/IY+d),n

LD A, (BC/DE)

LD (BC/DE),A

ADD/ADC/SUB/SBC/AND/OR/XOR/CP A, (HL/IX+d/IY+d)

INC/DEC (HL/IX+d/IY+d)

RLC/RL/RRC/RR/SLA/SRA/SRL (HL/IX+d/IY+d)

BIT/SET/RES b,(HL/IX+d/IY+d)

In these instructions, when ADL is 1, A23-16 of the memory address for the execution cycle(s) are taken from the high-order 8 bits of the 24-bit register, while when ADL is 0 these address lines are taken from the MMU and/or the MBASE register. These conventions can be overridden for one of these instructions by preceding it with a prefix (suffixing its assembler opcode with "0.16" or "0.24").

Stack Pointer

EX (SP),HL/IX/IY, PUSH, POP, LD SP,(nnnn), LD (nnnn),SP, LD SP,nnnn

These instructions use SPL if ADL is 1, while if ADL is 0 they use SPS, mapped by the MMU and MBASE. This convention can be overridden for one instruction by preceding it with a prefix (assembler opcode suffix "0.16" or "0.24").

Direct Addresses

LD r,(nnnn), LD (nnnn),r, LD rr,(nnnn), and LD (nnnn),rr,

When fetching these instructions, after fetching the first two bytes of address the processor fetches a third (MS) byte to use as A23-16 if ADL is 1, while if ADL is 0 the processor fetches only two bytes of address, and uses the MMU and MBASE for A23-16. This convention can be overridden for one instruction by preceding it with a prefix (assembler opcode suffix .16 or .24).

Multi-byte Immediate Data

LD rr,nnnn

When fetching the instruction, after fetching the first two bytes of address or data the processor fetches a third (MS) byte if ADL is 1, while if ADL is 0 the processor fetches only two bytes of address or data, and takes bits 23-16 of the value as zero. This convention can be overridden for one instruction by preceding it with a prefix (assembler opcode suffix .i16 or .i24).

16 vs. 24-bit Memory Data

EX (SP),HL/IX/IY, LD BC/DE/HL/SP/IX/IY,(nnnn), LD (nnnn),BC/DE/HL/SP/IX/IY, PUSH*, and POP*

In execution/stack cycles for these instructions, the processor stores and/or fetches a third (MS) byte in memory after the first two if ADL is one, but not if ADL is zero. For memory-fetch cycles (including POP) when ADL is zero, the processor zeroes bits 23-16 of the affected register. This convention can be overridden for one instruction by preceding it with a prefix (assembler opcode suffix 0.16 or 0.24). Note that PUSH AF and POP AF with ADL=1 are special cases. For these, SP is incremented or decremented by 3 as for other stack operations, but there is no reason to actually read or write a third data byte.

Internal 16- vs. 24-bit Operations

LD SP,HL/IX/IY,

EX DE,HL,

LDI, LDIR, LDD, LDDR, CPI, CPIR, CPD, CPDR,

ADD/SUB/SBC HL,rr,

ADD IX/IY,rr,

INC/DEC rr,

JR e, JR cc,e, DJNZ e,

INI, INIR, IND, INDR, OUTI, OTIR, OUTD, and OTDR,

For these instructions, if ADL is 1 the operation affects all 24 bits of registers that are loaded or modified, otherwise bits 23-16 of affected registers are zeroed. This convention can be overridden for one instruction by preceding it with a prefix (assembler opcode suffix 0.16 or 0.24).

Condition Codes

ADD/ADC/SBC rr,rr and BC decrementing in LDI, LDIR, LDD, LDDR, CPI, CPIR, CPD, CPDR, For these instructions, the result condition code reflects the 24-bit result if ADL is 1, else it reflects the 16-bit result as on the 18x. This convention can be overridden for one instruction by preceding it with a prefix (assembler opcode suffix 0.16 or 0.24).

CALL. RST, and RETurn

There are no special instructions to change ADL, because after such an instruction PC would undergo an unmanageable shift in interpretation. ADL can be changed only by prefixing a CALL, or JP nnnn instruction with a .i16 or .i24 prefix, or a RST, RET or JP (rr) instruction with a 0.16 or 0.32 prefix. Table 1 describes the operation of CALL. Table 2 describes the operation of RST, JP nnnn., RET, RETI, or RETN, JP (rr)

In "mixed ADL" applications:

1. All routines must be CALLed in the mode for which they were compiled or assembled;
2. Routines that may be CALLed from the opposite mode, must be called with a prefix, even from the same mode;
3. Routines that may be CALLed from the opposite mode, must return using a RET or JP (rr) instruction prefixed with 0.16 or 0.24;

For RET, execution is the same for either prefix. A byte is popped off SPL and its units bit is loaded into a holding bit we'll call newADL. If ADL is 0 and newADL is 1, another byte is popped using SPL, into PC23-16. If ADL is 0, two bytes are popped into PC15-0, from SPS mapped by the MMU and MBASE. If ADL is I and newADL is 0, two bytes are popped from SPL into PC. If ADL and newADL are both 1, 3 bytes are popped into PC from SPL.

Finally, newADL is loaded into ADL. For JP (rr) the routine must know the mode of the caller; ADL is set for a 0.24 prefix and cleared for a 0.16 prefix.

4. If calling code operating in one mode must pass stack-based operands/arguments to a routine compiled or assembled for a different mode, it must use prefixed instructions to set up the operands/arguments. For PUSH, 0.16 and 0.24 prefixes control both whether SPS or SPL is used, and whether the operands/arguments are stored as 2-byte or 3-byte values.

A multitasking routine or debug monitor would typically operate with ADL set. Such a multitasking routine can save and restore SP 16 for a 16-bit task by means of LD. 16i24 (memloc),SP and LD. 16i24 SP,(memloc) instructions respectively.

If a 24-bit debug monitor or multitasking executive needs to access memory in the same way a 16-bit task running under it would, it can use instructions like LD.16 r/rr,(rr) and LD.16 (rr),r/rr. These will apply the MMU and/or MBASE to the address in the register, as the 16-bit task would.

Instruction Prefixes

EZ80 instruction prefixes occupy one byte, not two as on the Z380. The lower-left quadrant of the main op-code map of the Intel 8080 and Zilog Z80, op codes 40 to 7F, is composed of 8-bit register-to-register Load instructions. The original Z80 architects noted that one of the opcodes on s the diagonal of this quadrant, 76, would be LD (HL),(HL) which is a NOP, so they used this opcode for the HALT instruction. What neither they nor subsequent architects have taken advantage of, is the fact that the same diagonal includes several other opcodes that are equivalent to NOP and that can be used for other purposes. The following table shows these opcodes and their operation on the EZ80:

| Op | On Zx8x | On EZ80 |
|---|---|---|
| 40 | LD B,B | .16i16 prefix |
| 49 | LD C,C | .24i16 prefix |
| 52 | LD D,D | .16i24 prefix |
| 5B | LD E,E | .24i24 prefix |
| ED7E | | SETMIX |
| ED7F | | CLRMIX |

As for the traditional Z80 prefix bytes, the EZ80 does not allow an interrupt to occur between fetching one of these prefix bytes and fetching the following instruction. These prefix bytes must precede traditional Z80 prefix bytes.

Table 3 shows which prefix selection affects each (class of) instruction. If an instruction is not shown in the table, its operation is not affected by these prefixes.

Interrupts, Instruction Traps, and Multitasking

The I register is not extended from 8 to 16 bits. Applications in which all routines that have interrupts enabled operate in the same ADL mode, should leave a global state called "mixed ADL" 0, as it is after reset. But applications that include routines that have interrupts enabled and use both ADL modes, should set the "mixed ADL" state by executing the new SETMLX instruction. At the time of an interrupt or instruction trap:

1. if ADL and mixed ADL are both 0, a 2-byte logical return address is stacked using SPS as mapped by the MMUJ and MBASE.
2. If ADL is 0 and mixed ADL is 1, a 2-byte logical return address is stacked using SPL.
3. If ADL is 1, a 3 byte return address is stacked using SPL.

Next, if "mixed ADL" is 1, a byte containing the ADL state of the interrupted process is pushed onto SPL, and ADL is then set to 1. If ADL is now 0:

1. for NMI, INT0 mode 0 (assuming RST from the peripheral), or INT0 mode 1, the logical interrupt address 00xx is loaded into PC.
2. For INT0 mode 2 or any of the 80180-type autovectors, the address formed by concatenating the I register and the vector, as mapped by the MMU and MBASE, is used to fetch a two-byte ISR address which is loaded into PC.

In either of these ADL=0 cases, the new PC value is mapped by the MMU and MBASE. All ISRs must operate using the same initial MMU configuration.

If ADL is now 1:

1. For NMI or INT0 mode 0 (assuming RST from the peripheral), or INT0 mode 1, the interrupt address 0000xx is loaded into PC.
2. For INT0 mode 2 or any of the 80180-type autovector, the address formed by concatenating the I register and the vector, with A23-16 all zero, is used to fetch a two-byte ISR address which is loaded into PC with 8 high-order zeroes. The interrupt vector table must be located in the first 65K of memory.

In either ADL=1 case, all interrupt service routines must start in the first 65K bytes of memory.

If "mixed ADL" is 1, the interrupt service routine must end with a RET, RETI, or RETN instruction prefixed with 0.16 or 0.24. Operation is the same for either prefix: a byte is popped off SPL and its units bit is loaded into ADL. If ADL is (now) 0, the return instruction fetches a 2-byte logical return address from SPL, and loads it into PC, in which it is then mapped by the MMU and MBASE. If ADL is still 1, the return instruction fetches a 3-byte return address from SPL and loads it into PC.

If "mixed ADL" is 0, interrupt service routines should end with an unprefixed RET, RETI, or RETN instruction.

Optional Add-on Multiply-accumulate Module (MAC)

Processors are often called on to perform functions of Digital Signal Processing. The most significant process in digital signal processing is the multiply-accumulate function, which forms a sum of products $$\sum_{i=1}^{n} X_i \times Y_i$$

where X and Y are vectors (tables of values, one-dimensional arrays) in memory. According to this embodiment of the present invention, a processor can optionally be configured to include an engine that can perform this kind of calculation at competitive performance levels.

MAC General Architecture

The MAC feature includes the following elements:

1. A 16×16 bit multiplier, the 32-bit product output of which goes to one input of an adder, the other input of which is the currently selected one of two 40 bit accumulator registers, the output of the adder also being the write side of that accumulator.
2. Two dual-port RAMs called X and Y. One port of each RAM is 16-bit read-only and feeds one side of the multiplier, and the second port is 8-bit read-write and is connected to the microprocessor bus, such that the RAMs are part of the microprocessor's memory space.
3. A set of registers in the microprocessor's I/O space, via which software can provide calculation parameters, start MAC operation, determine when the MAC has completed a calculation, and retrieve the result accumulation.

Key Design Points

1. A major point affecting the MAC design is whether the size of the X and Y RAMs is less than or equal to 512 bytes (256 values) each. If 256 values are sufficient for the class of applications to be addressed, then the Base, Start, Top, and Length values described below fit in a single byte. If more RAM is needed, these values require two bytes each. This is important mainly in terms of the number of bytes the MPU must transfer in order to set up and specify a new calculation.
2. The hardware may be made simpler if one or both of the in-shift and out-shift values described below is/are not needed.
3. DSPs often offer a choice of incrementing or decrementing through a vector (table, array). If this capability is desired in this module, the option can be specified in the Control register described below, in place of the Noise bit.

Register Blocks

The MAC register block is in the I/O space and can be block loaded using an OT12R instruction. Actually there are two register blocks in the MAC, one of which is accessible to the processor and the other of which can be used by the MAC, in a ping-pong fashion. Each register block includes the values as listed in Table 4.

The MAC also provides one Status register in I/O space that indicates the state of both register banks. Common (non-transient) states of this register are shown in Table 5.

The MAC is designed so that software can write its register block using OT12R instructions and read it using IN12R instructions. (IN12R is like INIR except that it increments the I/O address in the C register as part of each cycle.) These instructions drive the value in the B register, which is the number of bytes remaining to transfer, onto the A 15-8 lines. The MAC decodes its I/O addresses only from the A7-0 lines, but does detect the last transfer of a block by decoding A 15-8 for 01.

If the Control byte or any of the AC0-3 registers is written with A15-8 equal to $01_{16}$, indicating the last byte to be written, or if AC4 is written regardless of A 15-8:

If other bank is "in progress", the MAC changes the state of the current bank from "empty" to "ready".

If the other bank is "empty" or "done", the MAC changes the state of the current bank to "in progress" and then swaps the banks.

If any of the AC0-3 registers is read with A15-8 equal to $01_{16}$, indicating the last byte to be read, or if AC4 is read regardless of A15-8, the MAC changes the state of the current bank from "done" to "empty". Then if the state of the other bank is "done", the MAC swaps the banks.

Whenever the MAC completes a calculation, it changes the state of the other bank from "in progress" to "done". If the current bank is "ready", the MAC then swaps the banks, changes the "new other" bank's state to "in progress", and starts doing the new calculation.

If software reads the state "other done, current empty" from the status register, and it has no "next calculation" to program, it can write a hex 80 to the status register. This simply swaps the banks, to "other empty, current done". Software can then access the result in the accumulator.

MAC Software View

To set up a new calculation, software proceeds as follows:

1. Read the status register. If the current status is "ready", the MAC hasn't yet started the previous calculation, and software will have to wait until it does. (At which time the current status changes to "done".)
2. If the current status is "done", software should read the result accumulation from as many of the AC0-3 registers as are needed, as described in the following procedure. (This will change the current status to "empty".)
3. If the current status is "empty", software should set up the HL register pair to point to the block describing the new calculation, C to the corresponding starting I/o address, and B to the number of bytes in the block. Then it should perform an OTI2R instruction.

To retrieve the result of a calculation, software should:

1. Read the status register. If the current status is "ready", the MAC hasn't yet started the last calculation that software provided, and software will have to wait until it does. (At which time the current status will change to "done".)
2. If the current status is "empty" and the other status is "done", write 8016 to the status register. This swaps the register banks so that the current status is now "done".
3. If both status fields say "empty", there is no result to retrieve.
4. If the current status is "done", software should read as many of AC0-3 as are needed. Since the MAC decodes the A15-8 lines to tell when such a transfer is complete, this can be done with an IN12R instruction. Alternatively, software can use NO instructions to read all 5 bytes into registers (AC4 last), or can use INO to read the first 0-3 bytes into registers, and one of the following two sequences to read the last byte needed:

| LD | BC,base+n+100h | or | LD | A,1 |
| IN | r, (C) | | IN | A, (base+n) |

5. Reading the last byte of the result changes the current status to "empty" unless there's another result to retrieve, in which case the "other" status will be "empty" and the current status will be "done".

Interrupts

The EZ80 has multiple sources of interrupts. In addition to Trap, there is the NMI, INTO and a possible of 64 vectored interrupts. Trap is a vectored interrupt which occurs when an undefined instruction is fetched. NMI is a non-maskable vectored interrupt. All other interrupts can be masked by resetting the IEF1 bit. Interrupt vectors consist of 24 bits.

Trap

A trap occurs when an undefined second or third opcode is fetched. When a trap occurs it pushes the Program Counter on the stack and then begins execution at address 000000h. During the Trap the TRAP<1:0>bus puts out a value depending upon which opcode and which type of fetch was being executed. These signals are valid on every clock rising edge.

| TRAP | TRAP Type |
|---|---|
| 00 | Normal Execution |
| 01 | TRAP First Instruction |
| 10 | TRAP Second Instruction |
| 11 | Reserved |

INT Interrupts

The INT interrupt can be set to operate in three different modes. INT Mode 0, Mode 1 and Mode 2.

Mode 0 Interrupt

Mode 0 interrupts require the peripheral to provide a RST or Call instruction when an interrupt is generated. The only valid commands that will be supported in this mode is the RST and Call instructions. Other commands will be processed as a NOP.

Mode 1 Intermpt

When a mode 1 interrupt is generated the EZ80 will push the Program Counter on the stack and then vector to the address 000038hex.

Mode 2 Interrupt

Mode 2 interrupt behave the same as the Z80.

Vectored Interrupts

The EZ80 has the ability to generate 128 vectored interrupts. The generation of the vectored interrupt is done by asserting INTV low and providing the vector on the IVS bus.

Interrupt Priority Table

| Priority | ISR starts at | Interrupt Source |
|---|---|---|
| Highest | 0000 | TRAP |
| | 0066H | /NMI |
| | IM0:n/a IM1:0038H | /INTO |
| | IM2:(I: value from device) | |
| Lowest | (I: <7:1>: IVS : 0) | /INTV |

Interrupt Enable Flag 1,2 (IEF1, IEF2)

IEF1 controls the overall enabling and disabling of all interrupts except for NMI and TRAP.

If IEF1=0, all maskable interrupts are disabled. IEF1 can be reset to 0 by the DI(Disable Interrupts) instruction and set to 1 by the EI(Enable Interrupts) instruction.

The purpose of IEF2 is to correctly manage the occurrence of NMI. During NMI, the prior interrupt reception state is saved and all maskable interrupts are automatically disabled (IEF1 is copied to IEF2 and then IEF1 is cleared to 0). At the end of the NMI interrupt service routine, execution of the RETN (Return from Non-maskable Interrupt) will automatically restore the state the interrupt receiving state (by copying IEF2 to IEF1) prior to the occurrence of NMI.

IEF2 state can be reflected in the PN bit of the CPU Status Register by executing LD A, I or LD A, R instructions as shown in Table 6

Architectural Overview For Specific EZ80 Release

What follows is a description in more detail of an EZ80 product the incorporates many aspects of the current invention and is anticipated to be announced in the last half of 1999. This processor will include many of the features thus discussed, including the following:

Upward-code-compatible from Z80 & Z180

Several address-generation modes including 24-bit linear addressing 24-bit registers and ALU One-clock-minimum bus cycles Optional autonomous Multiply-Accumulate engine for DSP applications FIG. 1 is a block diagram of this EZ80. FIG. 2 shows the logic diagram of the EZ80. Processor and Device Pin Descriptions describes the processor and device pins.

OPERATIONAL DESCRIPTION

This section describes, using text and the attached tables, and figures, how the various parts of the EZ80 operate. This description is presented from the processor outward to the peripherals. In the latter parts of this section, refer to the corresponding section of I/O Registers. The Appendix includes additional information about a specific EZ80 configuration with additional components.

Processor Description

The EZ80 is an 8-bit microprocessor that performs certain 16- or 24-bit operations. In both data sizes, the processor includes an accumulator. Register A is the accumulator for 8-bit operations, and the HL register pair is the accumulator for 16- and 24-bit operations.

Processor Procram Reeisters

In addition to register A, there are six more 8-bit registers named B, C, D, E, H, and L, which can also be operated on as register pairs BC, DE, and HL. Flag register F completes the basic register bank.

Two of these basic register banks are included in all Z80 and Z180 processors. High-speed exchange between these banks can be used by a program internally, or one bank can be allocated to the mainline program and the other to interrupt service routines.

Finally, two Index registers IX and IY allow base and displacement addressing in memory. IX and IY are not included in the register banks on the Z80 and Z 180; there is only one copy of each.

The EZ80 expands the width of the BC, DE, HL, IX, and IY registers from 16 to 24 bits. The Arithmetic/Logic Unit and internal data paths are similarly expanded to 24 bits.

Processor Control Reeisters

In addition to the data-oriented registers described above, the EZ80 processor includes several other control registers. Unlike the registers in I/O space that are described in Section 4, these control registers have no addresses, but are used implicitly in certain processor operations.

Program Counter (PC)

This 16- or 24-bit register tracks program execution by the processor, which automatically increments PC while fetching instructions. The processor stores PC on the stack when it executes a CALL or RST instruction, or an interrupt or Trap occurs. It loads PC with a new value when it executes a JUMP, CALL, RST, or RET instruction, and when an interrupt, Trap, or Reset occurs. PC resets to 0000.

Stack Pointer (SPS or SPL)

SPS is a 16-bit register that is used when the ADL bit is cleared, while SPL is a 24-bit register that is used when ADL is set. The processor decrements the current SP register by 2 or 3, and stores a 16- or 24-bit value in memory at this updated address, when it executes a PUSH, CALL, or RST instruction, and when an interrupt or Trap occurs. The processor fetches a 16- or 24-bit value from memory at the address in SP, and then increments SP by 2 or 3, when it executes a POP, RET, RETI, or RETN instruction. Software can store the value in SP in memory, load SP from memory or another register, or load it with a constant/immediate value. Further, software can add or subtract the value in SP to or from another register, and can increment or decrement SP. Finally, software can exchange the 16- or 24-bit value in memory, to which SP currently points, with the contents of a 16- or 24-bit register. SP resets to 0000.

Flags (F)

The processor includes two Flag registers each containing six bits, named Zero (Z), Carry (CF), Sign (S), Parity or Overflow (P/I), Half-Carry (HC) and Add/Subtract (N). Certain flags are automatically updated as part of executing certain instructions. Subsequent instructions can then use the flags, either as an operand (A DC, SBC, DAA), or to determine whether to perform a JUMP, CALL, or RET operation. The flags can be saved on the stack with a PUSH instruction, or restored from the stack with a POP instruction. The two sets of flag registers are paired with the two A accumulators; the current pair is toggled by the EXAF,AF' instruction.

Operating Modes

The multiple operating modes of the processor allows Z80 and Z180 code to be run without change in "virtual Z80" or "virtual Z180" partitions, in the same application with new code that takes advantage of the EZ80's 16M byte linear addressing space and enhanced instruction set.

These operating modes are governed by four factors:

a state bit called ADL, which stands for Address and Data Long, another state bit called "mixed ADL", an 8-bit register called MBASE, and the state of the EZ80's 80180-compatible Memory Management Unit (MMU).

Native Z80 Mode

ADL, mixed ADL, and MBASE reset to zero, and the MMU resets to an inactive state. In this Native Z80 state, the programming model includes 16-bit registers and addresses, and a 64K byte memory space at the start of the EZ80's potential 16M byte memory space.

Virtual Z80 Mode

If ADL is cleared, the MMU is not enabled, but MBASE contains a non-zero value, the programming model still includes 16-bit registers and a 64K byte memory space, but this space is relocated by MBASE. In this mode, several tasks can each have their own Z80 partition.

Native Z180 Mode

If ADL is cleared, MBASE contains zero, and the MMU is active, the programming model is fully Z80186 compatible. The model includes 16-bit registers and a 64K byte logical memory addressing space, but the MMU translates these logical addresses to 20-bit physical addresses. The 64K byte logical address space can be divided into one to three areas, two of which can be relocated anywhere within the first 1 M bytes of the EZ80's potential 16M byte memory space.

[Virtual Z]80 Mode

If ADL is cleared, the MMU is active, and MBASE contains a non-zero value, the MMU handles mapping within a 1M byte virtual physical address space that is relocated by MBASE. In this mode, several tasks can each have their own Z180 partition.

ADL Mode

If ADL is set, neither the MMU nor MBASE has any effect on memory addressing. In this mode, the PC, BC, DE, HL, IX and IY registers are expanded from 16 to 24 bits, and a 24-bit Stack Pointer Long (SPL) register replaces the 16-bit Stack Pointer Short (SPS) register that is used in the other modes. When the processor fetches an instruction that includes a 16-bit address or immediate datum in the other modes, it automatically fetches a 24-bit address or datum. Thus, code that operates in ADL mode must be generated by an EZ80-compatible compiler or assembler that generates such instructions.

Mode Switching

The EZ80 switches between ADL mode and any of the other modes only as part of a specially-prefixed CALL, JP, RET, or RST instruction, or an interrupt or trap operation. The MBASE register can be changed only in ADL mode. The MMU can be programmed in any mode, but in a non-ADL mode software must take care not to affect its Program Counter when programming the MMU.

Interrupt and Traps

Applications that operate only in Native Z80 mode, ADL mode, or Native Z180 mode with Common Bank 0 always enabled, are relatively simple with respect to interrupts and traps. In these modes, memory always starts at the start of the EZ80's potential 16M byte memory space, and the interrupt and trap locations are never mapped.

However, applications that switch between modes, or operate in Virtual Z80, Virtual Z 180, or Native Z180 mode with Common Bank 0 disabled, can simplify interrupt and trap handling by executing a STMIX instruction to set the mixed ADL bit.

If the mixed ADL bit is 1, interrupts and instruction traps stack the ADL state as well as the PC, and enter ADL mode in the first 64K bytes of the EZ80's potential 16M byte memory space.

I/O Space

A separate I/O space includes on-chip and off-chip peripheral devices. On the Z80, 1/O space included 8-bit addresses and 256 bytes. All Z180 processors, and the EZ80, feature an expanded I/O space with 16-bit addresses and 65K bytes. The EZ80 includes a few on-chip peripherals in I/O space, which can be augmented by external peripherals.

Other Processor Control Registers

Interrupt High Address (I)

The contents of this register are used as the eight high-order address bits, when the processor fetches the address of an interrupt service routine from memory, for an interrupt from the INT1 or INT2 pin, or from an on-chip peripheral. The I register points at a table of interrupt service routine addresses, that starts at a 256-byte boundary in the 65K-byte logical address space. The I register resets to zero, and can be read or written by the dedicated instructions LD A,I and LD I,A.

R Counter (R)

On the Z80 18x family processors this register contains a count of executed fetch cycles. R resets to zero, and can be read or written by the dedicated instructions LD A,R and LD R,A.

Illegal Instruction Traps

Like most processors, the defined instruction set for the Z8018x family does not fully cover all possible sequences of binary values. The op code maps shown in the Tables include numerous blank cells. These represent op code sequences for which no operation is defined, and are commonly called illegal instructions.

When a EZ80 or other Z8018x processor fetches one of these sequences, it performs a Trap sequence as follows:

1. It sets the TRAP bit in the Interrupt/Trap Control register.
2. If the processor detected the condition while fetching the second byte of the instruction, it clears the UFO bit in the Interrupt/Trap Control register. If it detected the condition while fetching the third byte, it sets UFO.
3. The processor decrements the Stack Pointer (SP) by 2 and stores the 16-bit logical address from PC, in memory at the new SP address. This address points to the last byte of the illegal op code sequence.
4. The processor then clears PC and resumes execution at logical address 0000.

Trap Handling

The code at logical address 0000 can optionally store the value of SP in memory, and then set SP to an area of memory dedicated to its private stack.

In all cases, the trap-handling routine must store as many registers among AF, BC, DE, HL, IX, and IY as it may use (worst case), by pushing them onto the stack. A general-purpose routine will store all of these registers, those in the alternate set, the value of I and the state of the Interrupt Enable flag.

Next, the Trap-handling code must distinguish among the four events that can bring execution to address 0000: a Reset, a Trap, a RST 0 instruction, and a program error such as a JUMP to a null pointer.

The code can detect a Trap by reading the Interrupt/Trap Control register (ITC) and checking bit 7 (TRAP). If this bit is 1, a Trap has occurred, and the code should handle it as follows:

1. Clear the TRAP bit by writing a 0 to bit 7 of the ITC,
2. Fetch the PC value stored on the stack.
3. Examine bit 6 of the ITC (UFO).
4. If the UFO bit is 0, decrement the PC value by 1, else decrement it by 2, so that it points to the start of the illegal instruction.

The next action of the trap handling routine depends on the application and its stage of development.

Extending the Instruction Set

Core software can use illegal instructions as extensions to the Z8018x instruction set. To do this, the trap handler must fetch and examine each illegal instruction. If an illegal instruction is an extension, the trap handler performs the extended operation that the instruction indicates. It then advances the stacked PC value over the instruction, restores the saved register values, and returns to the next instruction.

Error Message vs. Restart

Except for such extended instructions, the trap handling software can either:

output an error message and wait for someone to examine the situation and restart the application, or attempt to restart the application immediately.

The former course is more common in the debugging/development stages of an application, while the latter may be more appropriate in the production/deployment stage. In the latter case, software may log the event for future readout, using an external storage medium or just in memory.

Interrupts

ZiLOG Z80 and Z80180 processors have a rich legacy of sophisticated interrupt capabilities. The EZ80 includes aspects of both families' interrupt characteristics.

Interrupt Resources in the EZ80

IEF1 and IEF2

These bits are internal to the processor and can only be affected and manipulated by certain specific events:

Reset clears IEF1 and IEF2

EI instructions set IEF1 and IEF2

DI instructions clear IEF1 and IEF2

An NMI sequence copies IEF1 to IEF2, then clears IEF1

A maskable interrupt clears IEF1 and IEF2

An LD A,I or LD A,R instruction copies IEF2 to the P/V flag

An RETN instruction copies IEF2 to IEF1

When IEF1 is 1, RESET and BUSREQ are both high, and no falling edge has occurred on NMI, the EZ80 checks for maskable interrupt requests from external pins and on-chip peripherals, as it completes each instruction, or each instruction iteration for HALT, the block I/O instructions, block move instructions, and block scan instructions.

The I Register

The EZ80 uses the contents of this register as A15-8 of the logical address for fetching interrupt service routine addresses from memory, and in response to interrupt requests from internal peripherals.

Nonmaskable Interrupt (NMI)

The EZ80 latches falling edges on the NMI pin. Only a low on RESET or on BUSREQ takes precedence over NMI. Unless RESET or BUSREQ is low, the EZ80 checks for a falling edge on NMI as it completes each instruction (each instruction iteration of HALT, the block I/O instructions, block move instructions, and block scan instructions), and performs an NMI sequence if a falling edge has occurred.

An NMI sequence includes 4 steps:

1. The processor copies the state of the IEF1 bit to IEF2.
2. It clears IEF1 to prevent maskable interrupts.
3. It decrements SP by 2, and stores the logical address in the PC in memory at the new address in SP . For most interrupts, this is the address of the instruction the processor would have executed next, if no interrupt had occurred. If the processor was stopped by HALT or SLP, it is the address of the next instruction. In the event of an incomplete block transfer, block scan, or block I/O instruction, it is the address of the instruction.
4. The processor loads 0066H into PC, and resumes execution from that logical address.

NMI Handlin,

NMI routines fall into two categories, based on whether the external hardware that drives NMI is capable of producing another falling edge on the pin, before the NMI service routine has completed its execution and returned to the interrupted process. We'll call the case when this isn't possible "Single Edge Guaranteed" and the case when it is possible "Repeated Edge Possible". Debug monitors, which may display the state of the interrupt process, fall into the Repeated Edge category.

Single Edge Guaranteed

An NMI routine in this category is similar to other interrupt service routines. This routine has the option of storing the contents of SP in memory and loading SP with the address of a memory area that is dedicated for its stack. In any case it must store as many of the registers as it may use during its execution (worst case).

Repeated Edee Possible

An NMI routine in this category should start with a PUSH AF instruction, then load A from a dedicated location in memory that indicates whether the interrupted process is the NMI routine. If this location indicates that it is, the routine should immediately POP AF and then do a RETN instruction, to return to its former execution.

If the in NMI location is cleared, software should set it. Then, if the NMI routine does either of the following:

a DI instruction in a "Save The Registers" routine that it shares with other means of entry, or displays the I register or the interrupt-enable state of the interrupted process, and allows a user/programmer to change these (in essence, a debug monitor) then it should perform. LD A,I and PUSH AF instructions. This stores the I register at the address in SP plus one, and the interrupt enabled state (IEF2) in the P/V flag and in bit 2 of the memory location pointed to by SP.

If the NMI routine uses a common "Save The Registers" subroutine that it shares with other entry points, the save subroutine can perform a DI instruction to prevent interruption by maskable interrupts.

The NMI routine has the option to store the SP value in a dedicated location in memory, and load SP with the address of a dedicated NMI stack area.

In any case, the NMI routine must PUSH as many other registers as it will use (worst case). A debug monitor will typically PUSH all registers in both banks, so that it can display them.

Exiting The NMI Routine

On completion of its processing, an NMI routine should restore the saved registers. If the routine used its own stack area, it should then restore the SP value of the interrupted process. If the routine set an in NMI memrory location on the way in, it should clear this location.

NMI routines that did not save the I register and IEF2 state at the start, can conclude with POP AF and REIN instructions. RETN copies the state of IEF2 back into IEF1, to restore the interrupt enable state of the interrupted process.

NMI routines which saved I and IEF2 at the start, should conclude with a POP AF for the saved I register and IEF2 bit, then an LD IA, followed by a JP V to a POP AF, EI, RET sequence. The JP should be followed by LD I,A, POP AF, and RET instructions.

*INTO (or INTO)

*INTO Modes

The EZ80 can handle interrupts requested by a device on the *INTO pin, in any of three ways called modes 0, 1, or 2. The special instructions IM 0, IM 1, and IM 2 select among these three modes. Reset selects mode 0.

*INTO Processor Response

The EZ80 performs an *INTO interrupt sequence at the end of an instruction (each instruction iteration for HALT, the block I/O instructions, block move instructions, and block scan instructions), if all of the following are true:

*INTO is low, bit 0 of the Interrupt/Trap Control register is 1 to enable *INTO, IEF1 is 1 to enable interrupts in general,
RESET and BUSREQ are both high, and
a negative edge on NMI has not been detected.

When all of these conditions occur simultaneously, the EZ80 responds as follows:

1. it clears IEF1 and IEF2 to prevent further interrupts,
2. It drives INSTRD low.
3. It waits several clock cycles.
4. It drives IORQ low. Simultaneous lows on INSTRD and IORQ indicate an *INTO interrupt acknowledge cycle. In response to this condition, the highest-priority peripheral that's requesting an interrupt places an 8-bit value on the D7-0 data bus.
5. It samples WAIT, and waits until it is high.
6. It terminates the cycle by driving INSTRD high, then IORQ high.

While all *INTO acknowledge cycles follow this general pattern, they differ as to what (if anything) the processor does with the data on D7-0, and what it does after the acknowledge cycle. These actions depend on the most recently executed IM instruction (if any), as described in the next three sections.

*INTO Mode 0

If no IM instruction was executed since Reset, or if the most recently executed IM instruction was IM 0, the EZ80 completes an *INTO sequence as follows:

7. It samples D7-0 and interprets the value as an instruction op code. In this mode, the vector registers of all ZiLOG daisy-chainable peripherals must be programmed to provide one of the RST opcodes C7, CF, D7, DF, E7, EF, F7, or FF16.

Note: Read RST as "Restart".

Note: The EZ80 does not automatically stack the contents of the program counter during an *INTO Mode 0 interrupt sequence. This means that the only other opcode that a peripheral can return (assuming the interrupted process is to be restarted) is a CALL instruction DC16. Intel 808x-family interrupt controllers can return a three-byte CALL instruction, but ZiLOG peripherals can't.

8. If the opcode is CALL, the processor fetches two more bytes to complete the instruction.
9. Given that the opcode was CALL or RST, the processor decrements SP by 2, and stores the contents of PC in memory at the new address in SP. Typically, this is the address of the instruction the processor would have executed next, if no interrupt had occurred. If the processor was stopped by HALT or SLP, it's the address of the next instruction. For an incomplete block transfer, block scan, or block I/O instruction, it's the address of the instruction.
10. If the opcode was RST, the processor resumes execution at logical address 0000, 0008, °, or 003816. If the opcode was CALL, it resumes at the logical address fetched in step 8.

In mode 0, each peripheral connected to *INTO needs to have a register, the contents of which it returns on D7-0 when it sees FNSTRD and IORQ low, and it is requesting an interrupt, and its IEI pin is high. Software should program each such register with one of the RST opcodes C7, CF, D7, °, FF16.

If a peripheral has a feature whereby it can replace the low-order bits of this value with a code reflecting its status, this feature must be turned off for mode 0 operation.

If the number of devices that can interrupt on *RNTO is reasonable, each device can have its own RST instruction, which improves interrupt response time by eliminating the need for the interrupt service routine to poll multiple devices.

If multiple devices have to share a RST instruction, that interrupt service routine should poll these devices in the same priority order that they are arranged on the IEI-IEO daisy chain. This is because a ZiLOG peripheral sets its IUS bit when it sees INSTRD and IORQ low, and it is requesting an interrupt, and its IEI pin is high. To insure proper operation of the daisy chain in the future, the polling process must lead to servicing the device that did this, and then clearing its IUS bit either explicitly, or for a Z80 peripheral by concluding the ISR with a RETI instruction.

*INTO Mode 1

If the most recently executed IM instruction was IM 1, the EZ80 completes an *INTO sequence as follows:

1. It ignores the data on D7-0. (Actually it proceeds as in mode 0, but considers itself to have captured FF16 which is RST 38.)
2. It decrements SP by 2, and stores the contents of PC in memory at the new logical address in SP. Typically, this is the address of the instruction the processor would have executed next, if no interrupt had occurred. If the processor was stopped by HALT or SLP, it's the address of the next instruction. For an incomplete block transfer, block scan, or block I/Q instruction, it's the address of the instruction:
3. It loads 003816 into PC, and resumes instruction execution from that logical address.

In mode 1, the interrupt service routine has to poll all of the devices connected to *INTO, to see which one generated the interrupt. If any ZiLOG peripherals can request an interrupt, this polling needs to be done in the same priority order that the devices are arranged on the IEI-IEO daisy chain. This is because a ZiLOG peripheral sets its IUS bit when it sees INSTRD and IORQ low, and it is requesting an interrupt, and its IEI pin is high, regardless of the processor's IM status.

To insure proper operation of the daisy chain in the future, the polling process must lead to servicing the device that did this, and clearing its IUS bit either explicitly, or for a Z80 peripheral by concluding the ISR with a RETI instruction. Probably the best way to insure this is by actually polling the IUS bits, for devices that allow them to be read.

*INTO Mode 2

If the most recently executed IM instruction was IM 2, the EZ80 completes an *INTO sequence as follows:

1. It captures the data from D7-0. This byte must have D0 low/0 for proper operation.
2. It decrements SP by 2, and stores the contents of PC in memory at the new logical address in SP. Typically, this is the address of the instruction the processor would have executed next, if no interrupt had occurred. If the processor was stopped by HALT or SLP, it's the address of the next instruction. For an incomplete block transfer, block scan, or block I/O instruction, it's the address of the instruction.
3. It puts the contents of the I register on A 15-8, and the value captured in step 7 on A7-0, and fetches the LS byte of an interrupt service routine address from memory at that address.

4. It makes A0 High/1, and fetches the MS byte of the interrupt service routine address from memory at that address.
5. It resumes execution at the logical address fetched in steps 9–10.

In mode 2, each peripheral connected to *INTO must have an Interrupt Vector Register, the contents of which it returns when it sees INSTRD and IORQ low, and it is requesting an interrupt, and its IEI pin is high. Software can program each such register with any even binary value.

If a peripheral has a feature whereby it can replace the low-order bits of this value with a code reflecting its status, this feature can be enabled in mode 2, in which case the peripheral "occupies more than one slot" in the interrupt vector table. Such "status affects vector" or "vector includes status" features can improve interrupt response time, by reducing the amount of status-polling that the interrupt service routine has to do, to identify the exact cause of the interrupt.

Interrupt Handlng

Any Interrupt Service Routine (ISR) has the initial option of saving the contents of SP in memory, and loading SP with the address of a memory area that is dedicated to its stack. Most interrupt service routines do not do this.

An *INTO ISR must save the contents of the registers it uses (worst case), using PUSH and/or EX AF,AF' and EXX instructions.

If the application includes a mechanism for allowing nested interrupts, the ISR can begin as specified by that mechanism, leading to an JE instruction that allows the ISR to be interrupted by other interrupts. Most applications do not do this.

The ISR must next read status registers from each device that can request an interrupt on *INTO, to identify the cause of the interrupt. The ISR must handle each interrupting device according to this status, and the device and application requirements.

Many ISRs read data from interrupting device(s), or write data to interrupting device(s). In addition, the ISRs can write registers in such a device, to modify its mode, status, or operation.

When interrupt processing is complete, if nested interrupts were allowed, the ISR should end as specified by the nesting mechanism. If nested interrupts were not allowed, the ISR should restore the saved registers and conclude with EI and RET instructions.

the Z80 and Z80180 instruction sets include an RETI instruction, that is used for servicing Z80 peripherals. Since the EZ80 includes no such peripherals, nor does it allow them to be connected externally, there is no reason to ever conclude a EZ80 ISR with an RETI . RET is both shorter and faster than RETI, and has the same function.

Memory (ROM and RAM)

The EZ80 can operate in any of several address-generation modes:

0 Native Z80 mode: the total memory address space is the first 64K bytes of the overall EZ80 memory space. Neither the Z80180-compatible Memory Management Unit (MMU) nor the Memory Base (MBASE) register has any effect on addressing.

Virtual Z80 mode: the memory address space can be any 64K bytes in the overall 16M byte EZ80 memory space, under control of the MBASE register. The MMU has no effect on memory addressing.

Native Z180 mode: the memory address space is the first 1M bytes of the overall EZ80 memory space, under control of the Z180-compatible MMU. MBASE has no effect on memory addressing.

Virtual Z180 mode: the memory address space can be any 1 M bytes of the overall 16M byte EZ80 memory space, under control of the MBASE register. The MMU operates within the selected 1 M space.

Address and Data Long (ADL) mode allows programs compiled or assembled for the EZ80 to operate in a 16M byte linear address space. In this mode, the 16-bit registers PC, BC, DE, HL, IX, and IY expand to 24 bits, as does the width of the ALU. The processor automatically fetches an extra byte of address or immediate data in those instructions that contain a 16-bit address or datum in other modes.

Prefix-override bytes allow any instruction to operate as in ADL mode in one of the first 4 modes, or to use 16 bits and/or MMU or MBASE addressing in ADL mode.

Addressing Modes

Instructions can specify a memory address in several ways. EZ80 addressing modes include:

Relative Addressing

JR and DJNZ instructions include a signed 8-bit displacement that specifies a range of addresses –126 to +129 from the op code, to which program control can be transferred.

Direct Addressing

In this mode, instructions include a 16-bit or 24-bit logical address, depending on the ADL mode bit.

Register Indirect Addressing

In this mode, the address is taken from one of the register pairs BC, DE or HL.

Indexed Addressing

In this mode, instructions include an 8-bit signed displacement from the address in an index register IX or JY.

Other contexts in which memory is accessed include instruction fetching, interrupts, DMA operations, and cycles generated by external masters while BUSACK is low.

Memory Management Unit (MMU)

The EZ80 includes an 80180-compatible Memory Management Unit in order to run programs written for an 8018x family processor without change. For new code, the 24-bit linear address mode is far more straightforward and easy to use.

When the MMU is enabled, it translates the 16-bit addresses used by software, called logical addresses, into 20-bit physical addresses, as part of all memory accesses performed by the processor.

The MMU has no effect on accesses performed by the DMA channels, which include 20-bit address registers. It also has no effect on addresses in I/O space, which always have A19-16 zero.

The MMU resets to a state in which it has no effect on addresses in processor cycles, passing A15-0 through without change and keeping A19-16 zero. If an application needs 65K bytes of memory or less, it need not concern itself with the MMU.

Even when the MMU has been programmed to perform active address transactions, it passes A11-0 from the logical to the physical address. We say that the MMU manages memory in 4K-byte blocks. Section MMU Registers below shows the registers associated with the MMU.

MMU Operation

The MMU compares bits 15-12 of each logical address to two 4-bit fields in its Common/Base Address Register (CBAR), in an unsigned manner.

If bits 15-12 of a logical address are less than the value in bits 3-0 of the CBAR, the MMU considers the address to be in Common Area 0. For such addresses, it passes bits 15-12 to the A15-12 pins unchanged, and sets pins A19-16 to 0.

If bits 15-12 of a logical address are greater than or equal to the value in bits 3-0 of the CBAR, but are less than the value in bits 7-4 of the CBAR, the MMU considers the address to be in the Bank Area. For such addresses, it adds the value in its 8-bit Bank Base Register (BBR) to bits 15-12 of the logical address, and outputs the 8-bit sum on pins A19-12.

If bits 15-12 of a logical address are greater than or equal to the value in bits 74 of the CBAR, the MMU considers the address to be in Common Area 1. For such addresses, it adds the value in its 8-bit Common Base Register (CBR) to bits 15-12 of the logical address, and outputs the 8-bit sum on A49-12.

The value in bits 7-4 of the CBAR must never be less than the vaiue in bits 3-0 of the CBAR.

MMU Configurations

In the general case, the MMIU divides the 65K-byte logical memory space into three parts, with Common Area 0 located at the start of the 1 Megabyte physical address space, and the Bank Area and Common Area 1 relocatable to other parts of the physical address space, under control of the Bank Base Register and Common Base Register, respectively.

Certain combinations of values in the CBAR result in the logical address space being divided into fewer active areas:

- If the CBAR contains zero, all logical addresses fall into Common Area 1, and are relocated to a contiguous 65K-byte area starting at the address in the CBR times 4096.
- If CBAR3-0 are zero but CBAR7-4 are non-zero, the Bank Area and Common Area 1 are active. Logical addresses less than (CBAR7-4)*4096 are relocated by the Bank Base Register, while other addresses are related by the Common Base Register.
- If CBAR7-4 and CBAR3-0 are equal and not zero, Common Area 0 and Common Area 1 are active. Logical addresses less than (CBAR3-0)*4096 are not relocated, and map to the start of physical memory. Other addresses are relocated by the Common Base Register.

The MMU After Reset

Because the CBAR resets to 11110000, logical addresses 0000-EFFFH are in the Bank Area and F000-FFFFH are in Common Area 1 after Reset. But since the BBR and CBR both reset to 0, the MMU passes all logical addresses through without change, with A 19-16 all zero.

Input/Output

The EZ80 includes an I/O space that is distinct from memory space. I/O space is accessed by means of IN and OUT instructions rather than LD, PUSH, POP, and other instructions that access memory space. The MMU passes addresses in I/O space through without change; such addresses always have A19-16 all zero.

I/O Instructions

The original Z80 featured a 256-byte I/O space. The following instructions are specific to the Z80's 256-byte I/O space, and should not be used on the EZ80 except to access external I/O devices that do not decode A 15-8:

OUT (port), A
IND
FNDR
INI
INIR
OTDR
OTIR
OUTD
OUTI

The following instructions ensure that A15-8 are all 0, and can be used to access the EZ80's on-chip I/O registers, as well as external devices that decode A 15-8 as all zero:

IN0 r, (port)
OUT0 (port), r
OTDM
OTDMR
OTIM
OTIMR

The following instructions drive A15-0 from the BC register pair, and can be used to access the fill 65K-byte I/O space:

IN r,(C)
OUT (C), r

The following instruction can access the entire 65K-byte I/O space, by pre-loading the MS 8 bits of the address into A. (This step is not necessary for external devices that don't decode A15-8.)

IN A, (port)

Clock Circuits

The EZ80 requires a logic-level clock on its CLK pin. This signal must be free of overshoot or ringing, must make continuous, monotonic, and rapid transitions in both directions, and must meet the minimum high and low times specified in AC Characteristics.

Reset Conditions

The effects of Reset on each of the registers in I/O space is described in Tables Listed Under Common Base Register (0038H) CBR.—ASCI Time Constant High (001BH) AS.TCH. in Section 4. Among processor registers, the following registers and state bits are cleared to zero: ADL, Mixed ADL, MBASE, PC, SP, 1, IEF1, IEF2, R, and F. The following are not changed by Reset: A, B, C, D, E, H, L, IX, and IY.

I/O Registers

Section Processor Description. describes the processor registers and the EZ80's programming model. This section describes the registers in I/O space, that control the operation of the overall device and its on-chip peripherals. Register addresses that don't appear in this table are not used.

Basic Device Reeisters

In one embodiment of the invention, one of the design goals was to keep basic device registers from beins specifically defined in the controller core. This allows flexibility and adaptability of the controller core to applications that may use different periperhal devices.

Typically, in controller designs, there is a core processor with an accompanying collection of peripherals that are accessed accessed by the controller via I/O operations. In the present invention, however, the core is made generic so that these device registers are not defined in the core.

MMU Registers

See the Memory Management Unit section for more about these registers.

Instruction Set

The EZ80 is descended from the ZiLOG Z80. Its 8-bit data bus and 24-bit address space fit well into a wide variety of mid-range embedded processing applications. This processor provides significantly more computing power than a microcontroller, at a fraction of the system cost of a larger microprocessor.

Table 11 through Table 20 document a number of instructions and features of an EZ80 according to one embodiment of the invention. Some of these are instructions that existed in the Z80 but are undocumented, do not exist in the Z8018x family, and are implemented and acknowledged in the EZ80. Others are new to the EZ80.

Classes of Instructions

Processor Flags

Table 21 shows the Flag register. Bits in this register are set and cleared by certain instructions as described in the EZ80 User Manual. Some of the Flags are tested by conditional JR, JP, CALL, and RET instructions, and some are used by subsequent instructions such as ADC, SBC, and DAA. The Flags can also be pushed and popped with accumulator A.

Condition Codes

Flag Settings Definitions (Table 22) shows the codes used in the Flags Affected columns of the Instruction Summary Table to indicate how each flag is affected by each type of instruction.

Table 23 (Condition Codes) shows the condition codes that can be used in conditional JP, CALL, and RET instructions in assembly language. A subset of these codes can also be used in JR instructions, which are shorter and faster than JPs. Table 24 (Symbols) describes other notation used in the Instruction Summary table.

Assembly Language Syntax

For two-operand instructions, Z80 assembly language syntax puts the destination operand before the source operand.

Example: LD A,(1234) is a Load instruction, while LD (1234),A is a Store instruction.

Past Z80 assemblers allowed the destination operand to be omitted (implicit) if the op code mnemonic only allowed one destination operand, for example, AND L instead of AND A,L . Use of these short forms is discouraged because they are a source of possible error (the programmer thinks that the "implicit" destination is other than it really is). But for the sake of legacy code, all known Z80 assemblers still accept the short form.

Caution: the assembly language uses C ambiguously, to designate one of the 8-bit registers as well as a condition code to test the Carry flag. This Product Specification uses CF to designate the Carry flag, and HC to designate the Half-Carry flag (as opposed to the 8-bit register H)

Instruction Summary

Table 25 describes each type or class of instruction, using the notation described in the preceding sections. The table is sorted by the assembly language mnemonics.

CONCLUSION

The invention has now been explained with regard to specific embodiments. Variations on these embodiments and other embodiments will be apparent to those of skill in the art. The invention therefore should not be limited except as provided in the attached claims.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A processor with multiple addressing modes comprising:

a first addressing mode allowing native addressing of a memory block of a first size;

a second addressing mode allowing virtual addressing of any memory block of approximately said first size;

a third addressing mode allowing native addressing of a memory block of a second size, said second size at least two times greater than said first size;

a fourth addressing mode allowing virtual addressing of any memory block of approximately said second size;

a fifth addressing mode allowing linear addressing of a memory block of a third size, wherein said third size is at least two times greater than said second size; and wherein said processor is capable of switching among said five modes.

2. A processor with multiple addressing modes comprising:

a first addressing mode allowing native addressing of a memory block of a first size;

a second addressing mode allowing virtual addressing of any memory block of approximately said first size;

a third addressing mode allowing native addressing of a memory block of a second size, said second size at least two times greater than said first size;

a fourth addressing mode allowing virtual addressing of any memory block of approximately said second size;

a fifth addressing mode allowing linear addressing of a memory block of a third size, wherein said third size is at least two times greater than said second size; and wherein said processor is capable of switching among multiple running processes and wherein these processes using different addressing modes can run concurrently.

3. A processor with multiple addressing modes comprising:

a first addressing mode allowing native addressing of a memory block of a first size;

a second addressing mode allowing virtual addressing of any memory block of approximately said first size;

a third addressing mode allowing native addressing of a memory block of a second size, said second size at least two times greater than said first size;

a fourth addressing mode allowing virtual addressing of any memory block of approximately said second size;

a fifth addressing mode allowing linear addressing of a memory block of a third size, wherein said third size is at least two times greater than said second size; and interupt service processing that operates consistently regardless of the addressing mode and context of a code that was interrupted and that is able to restore said mode and context upon completion of interrupt processing.

4. A processor with multiple addressing modes comprising:

a first addressing mode allowing native addressing of a memory block of a first size;

a second addressing mode allowing virtual addressing of any memory block of approximately said first size;

a third addressing mode allowing native addressing of a memory block of a second size, said second size at least two times greater than said first size;

a fourth addressing mode allowing virtual addressing of any memory block of approximately said second size;

a fifth addressing mode allowing linear addressing of a memory block of a third size, wherein said third size is at least two times greater than said second size; and a kernel process operating in said fifth mode and supervising operation of multiple processes operating in any of the five modes.

5. A processor with multiple addressing modes comprising:

a first addressing mode allowing native addressing of a memory block of a first size;

a second addressing mode allowing virtual addressing of any memory block of approximately said first size;

a third addressing mode allowing native addressing of a memory block of a second size, said second size at least two times greater than said first size;

a fourth addressing mode allowing virtual addressing of any memory block of approximately said second size;

a fifth addressing mode allowing linear addressing of a memory block of a third size, wherein said third size is at least two times greater than said second size; and a short and a long stack pointer register wherein said short stack pointer register is used as the stack pointer during some addressing modes and said long stack pointer register is used as a stack pointer during other addressing modes.

6. A processor with multiple addressing modes comprising:

a first addressing mode allowing native addressing of a memory block of a first size;

a second addressing mode allowing virtual addressing of any memory block of approximately said first size;

a third addressing mode allowing native addressing of a memory block of a second size, said second size at least two times greater than said first size;

a fourth addressing mode allowing virtual addressing of any memory block of approximately said second size;

a fifth addressing mode allowing linear addressing of a memory block of a third size, wherein said third size is at least two times greater than said second size; and an autonomous MAC able to calculate a sum-of-products from a set of values stored in a shared memory while the processor is executing other operations.

7. The processor according to claim 6 wherein said MAC is initialized by providing a start address and an indication of the length of values to be calculated.

8. The processor according to claim 6 wherein said MAC is initialized by said processor providing base, start, top, and length values.

9. A Z80 compatible processor with multiple addressing modes comprising:

a first native addressing mode allowing native addressing of the first 64K memory block within a memory space of at least 16M;

a second addressing mode allowing virtual addressing of any 64K memory block within said memory space;

a third addressing mode allowing native addressing of a first 1M memory block within said memory space;

a fourth addressing mode allowing virtual addressing of any 1M memory block within said memory space;

a fifth addressing mode allowing linear addressing within said memory space.

10. The processor according to claim 9 further comprising:

a kernel process operating in said fifth mode and supervising the operation of multiple processes operating in other modes, some of which may be originally written for the Z80 and without modification under said processor.

11. The processor according to claim 9 wherein at least one of said addressing modes utilizes a memory management unit.

12. The processor according to claim 9 further comprising:

a major mode bit that detennines operation with respect to 16 vs. 24 bit addressing.

13. The processor according to claim 12 further comprising:

wherein when said major mode bit is 0, address bits A23-16 are normally taken from the output of a Z18x memory management unit with 4 high order zeroes, plus the contents of an 8-bit MBASE register;

wherein both said major mode bit and MBASE are cleared to zero by a reset signal; and wherein MBASE can only be written when ADL is 1.

14. The processor according to claim 12 further comprising:

when a program or task operates with said major mode bit=0 and does not use a memory management unit, MBASE directly selects a 64K byte block of memory in which the program or task operates.

15. The processor according to claim 9 further comprising when 24-bit operation is indicated:

extending a plurality of processor registers from 16 to 24 bits;

extending an ALU from 16 to 24 bits; and extending data paths from 16 to 24 bits.

16. The processor according to claim 15 further wherein when 24-bit operation is indicated, address pins A23-16 are normally taken from said register extensions.

17. The processor according to claim 16 capable of executing an instruction having a prefix indicating that for this instruction, addressing should use the MMU and MBASE as in other modes.

18. The processor according to claim 9 further comprising:

a short and a long stack pointer register wherein said short stack pointer register includes only 16 bits and is used as a stack pointer (with the MMU and MBASE providing additional addressing information) when 16 bit operation is indicated.

19. The system according to claim 9 wherein instruction prefixes occupy one byte.

20. The system according to claim 9 wherein a plurality of opcodes that were equivalent to NOP codes in predecessor Z80 processors are used for other purposes.

21. The system according to claim 20 wherein said plurality of opcodes have the following operation:

| Op | On Zx8x | On EZ80 |
|---|---|---|
| 40 | LD B,B | .16i16 prefix |
| 49 | LD C,C | .24i16 prefix |
| 52 | LD D,D | .16i24 prefix |
| 5B | LD E,E | .24i24 prefix |
| ED7E | | SETMIX |
| ED7F | | CLRMIX. |

22. The processor according to claim 9 further comprising:
an autonomous MAC able to calculate a sum-of-products from a set of values stored in the processor address space while the processor is executing other operations.

23. The processor according to claim 22 wherein said MAC comprises: a 16×16 bit multiplier, the 32-bit product output of which goes to one input of an adder, the other input of which is the currently selected one of two 40 bit accumulator registers, the output of the adder also being the write side of that accumulator;

two dual-port RAMs, one port of each RAM being a 16-bit read-only port that feeds one side of the multiplier, and the second port being an 8-bit read-write port connected to the microprocessor bus, such that the RAMs are part of the processor's memory space; and a set of registers in the processor's I/O space, via which the processor is capable of providing calculation parameters, start MAC operation, determine when the MAC has completed a calculation, and retrieve a resulting accumulation.

24. The processor according to claim 22 wherein 256 values are sufficient for a class of applications to be addressed, such that Base, Start, Top, and Length values described below each fit in a single byte.

25. The system according to claim 22 wherein a MAC register block is in the processor's I/O space and capable of being block loaded using an OT12R instruction.

26. The system according to claim 22 wherein there are two register blocks in the MAC, one of which is accessible to the processor and the other of which can be used by the MAC, in a ping-pong fashion.

27. The system according to claim 22 wherein a MAC register block includes the following values:

| Register | Function |
|---|---|
| X, Y Start | The addresses in the X and Y RAMs, respectively, of first values to be multiplied. |
| X, Y End | Addresses in the X and Y RAMs, of the end of a circular buffer in each RAM. |
| X, Y Reload | Addresses in the X and Y RAMs, of the beginning of the circular buffer in each RAM.<br>(As the MAC performs the calculation, it typically increments its working addresses to get to the next pair of values. If a working address matches the corresponding End register, instead of incrementing, the MAC loads the contents of the corresponding Reload register into the working address.) |
| Length | The number of pairs of values to be multiplied and accumulated. |
| Control | The accumulator is cleared when this register is written. It contains the following parameters:<br>In Shift: a 3-bit value that specifies the number of low-order bits that should be appended below a value written to AC0–4. If this field is non-zero and AC4 is written, this number of high-order bits are ignored.<br>Out Shift: a 3-bit value that specifies the number of low-order bits of the accumulation that should be discarded by shifting, when AC0–4 are read. If this field is non-zero, reading AC4 will include this number of high-order zeroes.<br>Noise: if In Shift is non-zero, the bit(s) that should be appended below the value written to AC0–4 or replaced by an increment/decrement bit.<br>Interrupt Enable: if this bit is 1, the MAC will request an interrupt when it completes the calculation specified in this bank. |
| AC0–4 | A starting value for the accumulator capable of being written to these locations. The accumulated value can be read from these locations, using an INI2R instruction. | and wherein MAC also provides one status register in I/O space that indicates the state of both register banks.

28. The system according to claim 22 wherein said MAC is designed so that software can write its register block using OTI2R instructions and read it using INI2R instructions and wherein OTI2R and INI2R are like OTIR and FNIR except that they increment the I/O address in the C register as part of each cycle.

* * * * *